United States Patent
Kanoh

(10) Patent No.: US 8,224,095 B2
(45) Date of Patent: Jul. 17, 2012

(54) IMAGE PROCESSING APPARATUS, IMAGE FORMING APPARATUS, IMAGE PROCESSING SYSTEM, AND IMAGE PROCESSING METHOD

(75) Inventor: Takayuki Kanoh, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 525 days.

(21) Appl. No.: 12/454,189

(22) Filed: May 12, 2009

(65) Prior Publication Data
US 2009/0285489 A1 Nov. 19, 2009

(30) Foreign Application Priority Data
May 15, 2008 (JP) .................................. 2008-128128

(51) Int. Cl.
G06K 9/46 (2006.01)
G06K 9/00 (2006.01)
G06K 9/34 (2006.01)
G06K 9/62 (2006.01)
G06K 9/68 (2006.01)

(52) U.S. Cl. ........ 382/190; 382/100; 382/173; 382/181; 382/209; 382/218

(58) Field of Classification Search .......................... None
See application file for complete search history.

(56) References Cited

U.S. PATENT DOCUMENTS

| | | | |
|---|---|---|---|
| 5,267,332 A * | 11/1993 | Walch et al. .................. 382/198 |
| 5,465,353 A * | 11/1995 | Hull et al. ............................. 1/1 |
| 7,580,955 B2 * | 8/2009 | Kondo et al. ........................... 1/1 |
| 2005/0180636 A1 * | 8/2005 | Iizuka ............................. 382/217 |
| 2008/0049264 A1 * | 2/2008 | Morimoto et al. ............. 358/464 |
| 2008/0095448 A1 | 4/2008 | Ono et al. |
| 2008/0177764 A1 | 7/2008 | Kise et al. |

FOREIGN PATENT DOCUMENTS

| | | |
|---|---|---|
| JP | 2001-319232 | 11/2001 |
| JP | 2003-256427 A | 9/2003 |
| JP | 2004-334337 | 11/2004 |
| JP | 2007-323382 A | 12/2007 |
| WO | 2007/004522 A | 1/2007 |

OTHER PUBLICATIONS

T. Nakai et al., "Document Image Retrieval and Removal of Perspective Distortion Based on Voting for Cross-Ratios", Meeting on Image Recognition and Understanding (MIRU 2005), Jul. 2005, p. 538-545.

* cited by examiner

*Primary Examiner* — Jason M Repko
*Assistant Examiner* — Jhere Rowland
(74) *Attorney, Agent, or Firm* — George W. Neuner; Edwards Wildman Palmer LLP

(57) ABSTRACT

A document matching process section retrieves a similar image on a basis of the result of a first comparison process for comparing features of a matching key image of first resolution that are stored in a features storage section with features of a matching reference image and the result of a second comparison process for extracting features from a matching key image of second resolution that is stored in an image data storage section and comparing the extracted features with features of the matching reference image that are stored in the features storage section. This allows accurately retrieving a matching reference image similar to the matching key image, even when the matching key image is a zoomed image, an N-up image, or an image of low resolution.

6 Claims, 18 Drawing Sheets

| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

| HASH VALUE | INDEX INDICATIVE OF IMAGE |
|---|---|
| H1 | ID1 |
| H2 | ID1 |
| H3 | ID1、ID2 |
| H4 | ID1 |
| H5 | ID1 |
| H6 | ID1、ID2 |
| ⋮ | ⋮ |

FIG. 14 (b)

| HASH VALUE | INDEX INDICATIVE OF IMAGE |
|---|---|
| H1、H5 | ID1、ID1 |
| H2 | ID1 |
| H3 | ID1、ID2 |
| H4 | ID1 |
| H6 | ID1、ID2 |
| ⋮ | ⋮ |

FIG. 15

| | INDEX INDICATIVE OF REFERENCE IMAGE | | |
|---|---|---|---|
| | ID1 | ID2 | ... |
| INDEX INDICATIVE OF FEATURE POINT | COORDINATES | COORDINATES | ... |
| f1 | $(X_{11}, Y_{11})$ | $(X_{21}, Y_{21})$ | ... |
| f2 | $(X_{12}, Y_{12})$ | $(X_{22}, Y_{22})$ | ... |
| f3 | $(X_{13}, Y_{13})$ | $(X_{23}, Y_{23})$ | ... |
| f4 | $(X_{14}, Y_{14})$ | $(X_{24}, Y_{24})$ | ... |
| ⋮ | ⋮ | ⋮ | |

FIG. 16

INDEX INDICATIVE OF MATCHED REFERENCE IMAGE

|  | ID1 | ID2 | ID3 | ID4 | ... |
|---|---|---|---|---|---|
| f1 | p1 | | | | |
| f2 | | | p2 | | |
| f3 | p3 | | | | |
| f4 | p4 | | | | |
| f5 | | | | p5 | |
| f6 | | p6 | | | |
| f7 | p7 | | | | |

INDEX INDICATIVE OF FEATURE POINT OF MATCHED REFERENCE IMAGE

IMAGE PROCESSING APPARATUS, IMAGE FORMING APPARATUS, IMAGE PROCESSING SYSTEM, AND IMAGE PROCESSING METHOD

This Nonprovisional application claims priority under 35 U.S.C. §119(a) on Patent Application No. 2008-128128 filed in Japan on May 15, 2008, the entire contents of which are hereby incorporated by reference.

TECHNICAL FIELD

The present invention relates to an image processing apparatus, an image forming apparatus, an image processing system, and an image processing method, each of which allows comparing features of a matching key image with a matching reference image so as determine a similarity between the matching key image and the matching reference image.

BACKGROUND ART

There have been proposed techniques for comparing (i) image data obtained by scanning a document image with a scanner with (ii) preliminarily stored image data so as to determine a similarity between the image data and the preliminarily stored image data.

Examples of a method for determining a similarity include: a method in which a keyword is extracted from an image with OCR (Optical Character Reader) etc. so as to carry out matching with the keyword; a method in which matching is carried out by extracting features of ruled lines included in an image; a method in which text strings etc. included in image data are replaced with points (feature points) and matching is carried out by use of features calculated based on positional relationships between these points.

Further, Patent literature 1 discloses a technique as follows: a descriptor is generated from features of an input document in such a manner as to be invariable to distortion caused by digitalization of a document or to a difference between the input document and a document used for matching in a document database. Then, matching between the input document and a document in the document database is performed using the descriptor and a descriptor database in which the descriptor is stored and which is indicative of a list of a document including features from which the descriptor is extracted. In the technique, when the descriptor database is scanned, votes for individual documents in the document database are accumulated, and a document with the largest number of votes obtained or a document whose number of votes obtained is over a certain threshold value is considered as a matching document.

Further, Patent literature 2 discloses a technique in which a centroid of a word in an English document, a centroid of a connected component of a black pixel, a closed space of a kanji character, a particular portion repeatedly appearing in an image etc. are extracted as feature points, a set of local feature points are determined out of the extracted feature points, a partial set of feature points is selected out of the determined set of local feature points, invariants relative to geometric transformation each as a value characterizing the selected partial set is calculated in accordance with plural combinations of feature points in the partial set, the calculated invariants are regarded as features, and a document matching is carried out based on the features thus obtained.

However, the above conventional techniques have a problem that when resolution of a matching key image is different from resolution of a matching reference image, it is impossible to accurately determine a similarity between the matching key image and the matching reference image.

The following explains the above problem in more detail. In the present specification, a "matching key image" indicates an image serving as a key in a matching process with respect to a preliminary stored image, and a "matching reference image" indicates an image to be retrieved when carrying out the matching process. For example, in a case of determining whether preliminary stored images include an image similar to a document image included in image data A, the document image included in the image data A is a matching key image and an image belonging to the preliminary stored images is a matching reference image. Further, in the present specification, a "reference image" indicates all images stored in an image processing apparatus or an image processing system. Therefore, in a case where a matching key image is an image stored in the image processing apparatus or the image processing system, the matching key image is also regarded as the "reference image".

In a case of determining a similarity between images based on features of the images, matching the images with the same resolution realizes the highest accuracy in the determination. This is because the same resolution between two images allows features serving as a standard for the determination to be extracted from the images under the same condition.

However, in a case where a matching key image is obtained by scanning an enlarged/reduced document or an N-up document or obtained from a FAX job, the size of a document image in the matching key image is different from the size of an original image of the document image. In particular, in an image job log system etc. in which read documents are serially stored, an image obtained by scanning an enlarged/reduced document or an N-up document or obtained from a FAX job is generally accumulated with resolution at the time of obtaining the image, often resulting in that the size of a document image included in these images is different from the size of an original image of the document image (the size at the time of processing the document image in a default state).

Consequently, in a case where features of the matching reference image are calculated based on the size of the original image of the document image (the size at the time of processing the document image in a default state), even when the matching key image is read with the same resolution as the time of obtaining the matching reference image (default resolution), the substantial resolution between the matching reference image and the matching key image is different.

In a case where the substantial resolution between the matching reference image and the matching key image is different, for example, a plurality of connected pixel regions that are not connected with each other in fact are recognized as connected pixel regions that are different from each other in an image of high resolution, whereas the connected pixel regions are recognized as one connected pixel region in an image of low resolution. This results in a problem that accuracy in similarity determination drops and a result of the determination differs.

For example, the following explains a case of comparing image data (matching reference image) obtained by scanning A4 documents A and B with 600 dpi with image data (matching key image) obtained by scanning an A4 two-up document with 600 dpi including images of the A4 documents A and B.

In a case of an A4 two-up document including images of two A4 documents, the two images are reduced by approximately 0.7 times with respect to their original sizes (A4 size). Therefore, substantial resolution of individual document images (documents A and B) included in the two-up document is approximately 420 dpi.

Therefore, features obtained by scanning each of the A4 documents A and B with 600 dpi are compared with features obtained by scanning the two-up document with 600 dpi (combination of features obtained by scanning the documents A and B with approximately 420 dpi). In this case, results of extracting features from individual documents are different from each other, making it difficult to accurately determine similarities between a matching key image (two-up image of the documents A and B) and matching reference images (images of the documents A and B with original sizes). This causes erroneous determination such as determination that the matching key image is similar to neither the document A nor the document B and determination that the matching key image is similar to only one of the documents A and B.

Citation List

Patent Literature 1

Japanese Patent Application Publication, Tokukaihei, No. 7-282088 A (Publication Date: Oct. 27, 1995)

Patent Literature 2

International Publication No. WO 2006/092957A1, pamphlet (Publication Date: Sep. 8, 2006)

Non-Patent Literature 1

Tomohiro NAKAI, Koichi KISE, and Masakazu IWAMURA: "Document Image Retrieval and Removal of Perspective Distortion Based on Voting for Cross-Ratios", Meeting on Image Recognition and Understanding (MIRU2005) (held by Computer Vision and Image Media Workshop, Information Processing Society of Japan), proceedings, page 538-545

SUMMARY OF INVENTION

The present invention was made in view of the foregoing problems. An object of the present invention is to accurately determine a similarity between a matching key image and a preliminary stored matching reference image even when the matching key image is an enlarged/reduced image, an N-up image, or an image of low resolution.

In order to solve the foregoing problem, the image processing apparatus of the present invention is an image processing apparatus, including: a features extraction section for extracting, from image data, features of an image that are included in the image data; features storage means for storing features of a reference image and identification information of the reference image in such a manner that the features are related to the identification information; and a similar image retrieval section for comparing features of an image designated as a matching key image with features of at least one matching reference image which is an image to be matched out of reference images whose features are stored in the features storage means, so as to calculate a similarity between the matching key image and each of said at least one matching reference image, and retrieving a similar image similar to the matching key image on a basis of the calculated similarity; the image processing apparatus including a resolution conversion section for converting resolution of the matching key image into first resolution and second resolution different from the first resolution, the similar image retrieval section retrieving the similar image on a basis of (i) a result of a first comparison process in which the features extraction section compares features extracted by the features extraction section from the matching key image of the first resolution with features of each of said at least one matching reference image that are stored in the features storage means and (ii) a result of a second comparison process in which the features extraction section compares features extracted by the features extraction section from the matching key image of the second resolution with features of each of said at least one matching reference image that are stored in the features storage means.

With the arrangement, the similar image is retrieved on a basis of (i) a result of a first comparison process in which the features extraction section compares features extracted by the features extraction section from the matching key image of the first resolution with features of each of said at least one matching reference image that are stored in the features storage means and (ii) a result extracted by the features extraction section from a second comparison process in which the features extraction section compares features of the matching key image of the second resolution with features of each of said at least one matching reference image that are stored in the features storage means. Since the similar image retrieval process is carried out on a basis of image data with plural resolutions with respect to the matching key image, it is possible to accurately retrieve a matching reference image similar to the matching key image, even when the matching key image an enlarged/reduced image, an N-up image, or an image of low resolution.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram schematically illustrating a configuration of a server included in an image processing system in accordance with an embodiment of the present invention.

FIG. 2 is an explanatory drawing schematically illustrating a configuration of an image processing system in accordance with an embodiment of the present invention.

FIG. 3 is a block diagram schematically illustrating a configuration of a multifunction printer included in an image processing system in accordance with an embodiment of the present invention.

FIG. 4 is a block diagram schematically illustrating a configuration of a terminal device included in an image processing system in accordance with an embodiment of the present invention.

FIG. 5 is a block diagram illustrating a configuration of a document matching process section included in the server in FIG. 1.

FIG. 6 is a block diagram illustrating a configuration of a feature point calculation section included in the document matching process section in FIG. 5.

FIG. 7 is an explanatory drawing illustrating an example of filter coefficients for a filter included in an MTF process section of the feature point calculation section in FIG. 5.

FIG. 8 is an explanatory drawing illustrating examples of a connected region extracted by the feature point calculation section in FIG. 5 from input image data and a centroid of the connected region.

FIG. 9 is an explanatory drawing illustrating an example of centroids (feature points) of connected regions extracted from a text string in input image data by the feature point calculation section in FIG. 5.

FIG. 10 is a block diagram illustrating a configuration of a features calculation section included in the document matching process section in FIG. 5.

FIG. 11 is an explanatory drawing illustrating an example of a target feature point and peripheral feature points that are extracted when the features calculation section in FIG. 10 calculates features.

FIGS. 12(a) to 12(d) are explanatory drawings each illustrating an example of a combination of a target feature point and peripheral feature points that are extracted when the features calculation section in FIG. 10 calculates features.

FIGS. 13(a) to 13(d) are explanatory drawings each illustrating an example of a combination of a target feature point and peripheral feature points that are extracted when the features calculation section in FIG. 10 calculates features.

FIG. 14(a) and 14(b)

FIGS. 14(a) and 14(b) are explanatory drawings each illustrating an example of a hash value regarding a feature point stored in a hash table and an index indicative of input image data.

FIG. 15

FIG. 15 is an explanatory drawing illustrating relations between document IDs of reference images, feature points of the reference images, and coordinates of the feature points, that are stored in the features storage section included in the document matching process section in FIG. 5.

FIG. 16

FIG. 16 is an explanatory drawing illustrating a voting process carried out by a voting process section included in the document matching process section in FIG. 5.

FIG. 17 is a graph illustrating an example of the number of votes for individual matching reference images in the voting process section included in the document matching process section in FIG. 5.

FIG. 18 is an explanatory drawing illustrating a coordinate conversion process for causing a coordinate system of feature points of a matching reference image to correspond to a coordinate system of feature points of a matching key image.

FIG. 19 is a flowchart illustrating a flow of a features storage process in the server in FIG. 1.

FIG. 20 is a flowchart illustrating a flow of a similar image retrieval process in the server in FIG. 1.

FIG. 21 is an explanatory drawing illustrating a modification example of an image processing system in accordance with an embodiment of the present invention.

DESCRIPTION OF EMBODIMENTS

One embodiment of the present invention is described below with reference to the attached drawings. In the present embodiment, an explanation is mainly made as to a case of an image job log system (image processing system) in which features (feature vectors) of a document image processed by a multifunction printer and an image ID corresponding to the document image are serially stored in a server in such a manner that the features are related to the image ID.

Figure 2:
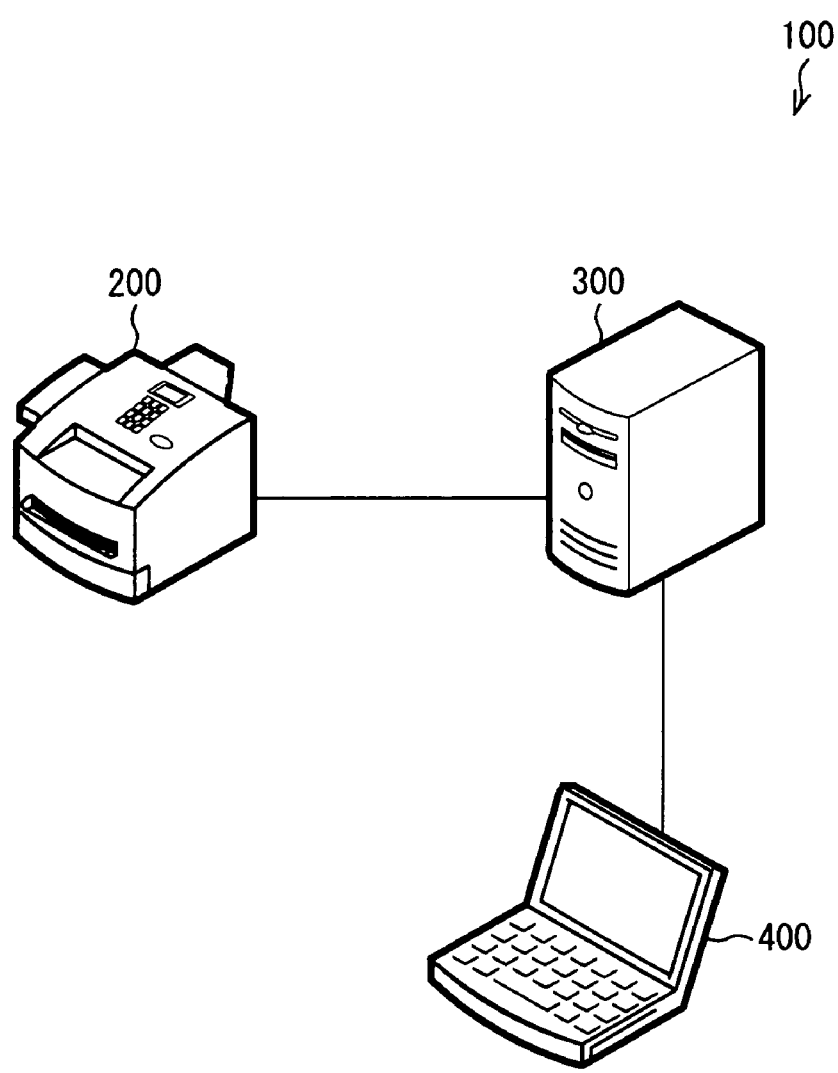
FIG. 2

FIG. 2 is an explanatory drawing schematically illustrating a configuration of an image processing system 100 in accordance with the present embodiment. As illustrated in FIG. 2, the image processing system 100 includes a multifunction printer 200, a server (multifunction printer supervising server) 300, and a terminal device 400. These devices are communicably connected with one another via a network. In the present embodiment, an explanation is made as to a case where the multifunction printer 200 and the server 300 are connected with each other via the network. Alternatively, the server 300 may be included in the multifunction printer 200.

The multifunction printer 200 includes functions such as a copy function, a printer function, a facsimile function, a scanner function, and a scan-to-e-mail function. Further, the multifunction printer 200 transmits what process has been carried out with respect to image data and the processed image data to the server 300.

The server 300 stores, as a log with a processed image, the image data from the multifunction printer 200 and what process has been carried out with respect to the image data.

The terminal device 400 is used for retrieving and browsing logs stored in the server 300. Further, the terminal device 400 transmits to the server 300 a similar image retrieval request for requesting the server 300 to search whether a matching reference image similar to a matching key image is stored in the server 300.

An example of the terminal device 400 is a personal computer etc.

Figure 3:
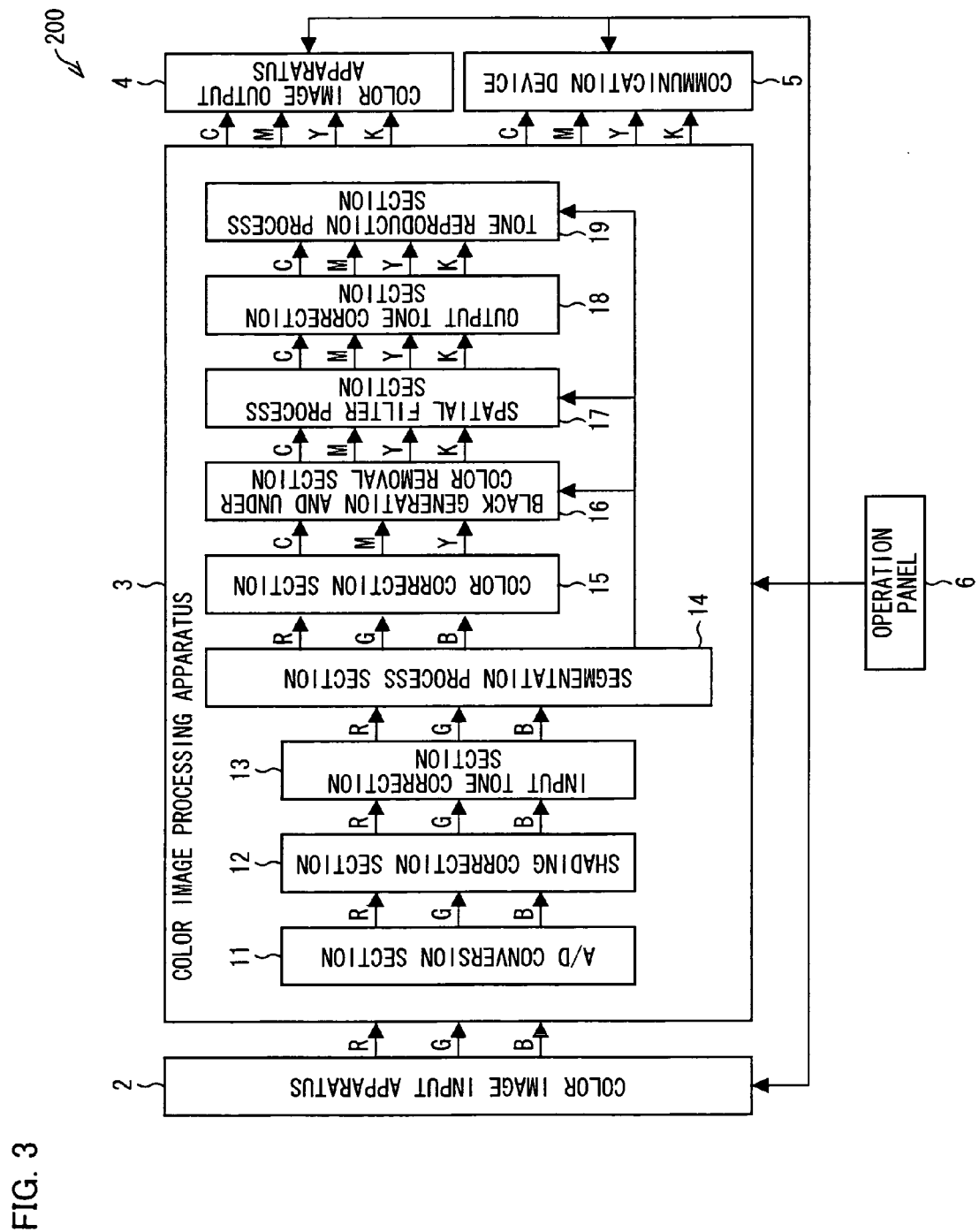
FIG. 3

FIG. 3 is a block diagram schematically illustrating a configuration of the multifunction printer 200. As illustrated in FIG. 3, the multifunction printer 200 includes a color image input apparatus 2, a color image processing apparatus 3, a color image output apparatus 4, a communication device 5, and an operation panel 6. The multifunction printer 200 has functions such as a copy function, a printer function, a facsimile function, a scanner function, a scan-to-e-mail function etc.

The color image input apparatus 2 scans an image of a document and generates image data. The color image input apparatus 2 includes a scanner section (not shown) having a device such as a CCD (Charge Coupled Device) for converting optical information into an electric signal. In the present embodiment, the color image input apparatus 2 converts an optical image reflected from a document to RGB (R: red, G: green, B: blue) analog signals and outputs the analog signals to the color image processing apparatus 3.

The color image processing apparatus 3 subjects the analog signals from the color image input apparatus 2 to various processes, converts the analog signals into signals that can be dealt with the color image output apparatus 4, and outputs the converted signals to the color image output apparatus 4. The color image processing apparatus 3 includes an A/D (analog/digital) conversion section 11, a shading correction section 12, an input tone correction section 13, a segmentation process section 14, a color correction section 15, a black generation and under color removal section 16, a spatial filter process section 17, an output tone correction section 18, and a tone reproduction process section 19. The analog signals read by the color image input apparatus 2 are transmitted in the color image processing apparatus 3 through the A/D conversion section 11, the shading correction section 12, the input tone correction section 13, the segmentation process section 14, the color correction section 15, the black generation and under color removal section 16, the spatial filter process section 17, the output tone correction section 18, and the tone reproduction process section 19 in this order, and are output as CMYK digital color signals. Then, the CMYK digital signals are output from the tone reproduction process section 19 and stored in a memory (not shown) and then output to the color image output apparatus 4 or the communication device 5.

The A/D conversion section 11 converts the RGB analog signals into RGB digital signals. The shading correction section 12 removes various distortions produced in an illumination system, an image focusing system, and an image sensing system of the color image input apparatus 2 from the RGB digital signals transmitted from the A/D conversion section 11.

The input tone correction section 13 adjusts color balance of the RGB signals from which the various distortions have been removed by the shading correction section 12, and converts the RGB signals into signals such as density signals that are easily processed in the color image processing apparatus 3.

The segmentation process section 14 separates each pixel of an input image represented by the RGB signals into either one of a text region, a halftone dot region, or a photograph (continuous tone) region. On the basis of a result of the separation, the segmentation process section 14 outputs a segmentation class signal, indicating which region a pixel of the input image belongs to, to the black generation and under color removal section 16, the spatial filter process section 17, and the tone reproduction process section 19. Further, the segmentation process section 14 outputs signals received from the input tone correction section 13 to the subsequent color correction section 15 without any modification.

The color correction section 15 removes color impurity on the basis of spectral characteristics of CMY (C: cyan, M: magenta, Y: yellow) color materials including an unnecessarily absorption component, in order to realize a faithful color reproduction.

The black generation and under color removal section 16 performs (i) a black generation process for generating a black (K) signal from three color (CMY) signals having been subjected to the color correction and (ii) a process for generating new CMY signals by removing the K signal generated in the black generation process from the original CMY signals. As a result, the three CMY signals are converted into four CMYK signals.

With the use of a digital filter, the spatial filter process section 17 performs a spatial filter process on the basis of a segmentation class signal, with respect to image data which is received in the form of the CMYK signals from the black generation and under color removal section 16. In the spatial filter process, the spatial filter process section 17 corrects a spatial frequency characteristic, so as to reduce blur or granularity deterioration in an output image. The tone reproduction process section 19, as with the spatial filter process section 17, performs a predetermined process with respect to the image data in the form of the CMYK signals, on the basis of the segmentation class signal.

For example, a region separated by the segmentation process section 14 into a text region is subjected to the spatial filter process by the spatial filter process section 17 in which the text region is processed by use of a spatial filter which sharpens a high frequency component in order to increase reproducibility of texts. Then, the text region is subjected to a binarization process or a multi-level dithering process by the tone reproduction process section 19 by use of a screen with high resolution suitable for reproduction of a high frequency component.

A region separated by the segmentation process section 14 into a halftone dot region is subjected to a low pass filter process by the spatial filter process section 17 in order to remove input halftone components. The output tone correction section 18 performs an output tone correction process in which a signal such as a density signal is converted into a halftone dot area ratio that is a characteristic value of the color image output apparatus 4. The tone reproduction process section 19 performs a tone reproduction process in which an image is separated into pixels so that each tone is reproduced. A region separated by the segmentation process section 14 into a photograph region is subjected to a binarization process or a multi-level dithering process by use of a screen suitable for tone reproduction.

Image data subjected to the above processes is temporarily stored in a memory (not shown) and then read out at a predetermined timing and output to the color image output apparatus 4 or the communication device 5. For example, when carrying out a copy function or a printer function, the image data is transmitted to the color image output apparatus 4, and when carrying out a facsimile function or a scan-to-e-mail function, the image data is transmitted to the communication device 5.

The color image output apparatus 4 outputs image data received from the color image processing apparatus 3 onto a recording material (e.g. paper). The color image output apparatus 4 is not particularly limited and may be a color image output apparatus based on an electrophotographic method or an ink jet method.

The communication device 5 includes a modem or a network card. When carrying out facsimile transmission, the communication device 5 carries out a transmission procedure with a destination by use of a modem to secure a state where transmission can be performed, and then the communication device 5 reads out, from the memory, image data encoded in a predetermined format (image data scanned by a scanner) and carries out necessary processing such as conversion of the encoding format, and then sequentially transmits the image data via a communication line to the destination.

When carrying out facsimile reception, the communication device 5 carries out a communication procedure and receives the image data from an originating communication device so as to input the image data to the color image processing apparatus 3. The color image processing apparatus 3 subjects the received image data to an encoding/decoding process by an encoding/decoding process section (not shown). The decoded image data is subjected to a rotation process and a resolution conversion process if necessary, and is subjected to an output tone correction process and a tone reproduction process, and is output from the color image output apparatus 4.

When carrying out the scan-to-e-mail function, the communication device 5 reads out, from the memory, image data which is R'G'B' image data (for example sRGB data) suitable for an image display converted by the color correction section 15 and which is encoded in a predetermined format (image data scanned by a scanner), and transmits an e-mail to which the image data is attached to a predetermined address.

Further, the communication device 5 carries out data communications with the server 300, the terminal device 400, and other devices that are connected with the network via a network card, a LAN cable etc.

The operation panel 6 includes a display section such as a liquid crystal display (not shown) and setting buttons (not shown) for example. The operation panel 6 causes the display section to display information corresponding to an instruction from a main control section (not shown) of the multifunction printer 200, and transmits, to the main control section, information entered by a user from the setting buttons. The user can enter a request for processing input image data, the number of sheets to be processed etc.

The main control section includes a CPU (central processing unit) for example, and controls performance of each section of the multifunction printer 200 on the basis of a program and data that are stored in a ROM (not shown) etc. and information etc. inputted from the operation panel 6.

When image data is processed in the multifunction printer 200, the main control section causes the communication device 5 to transmit the image data and operation log information for the image data to the server 300. The operation log information may include a time when image data was processed, the name of a user, a process mode, the result of the process etc.

Figure 1:
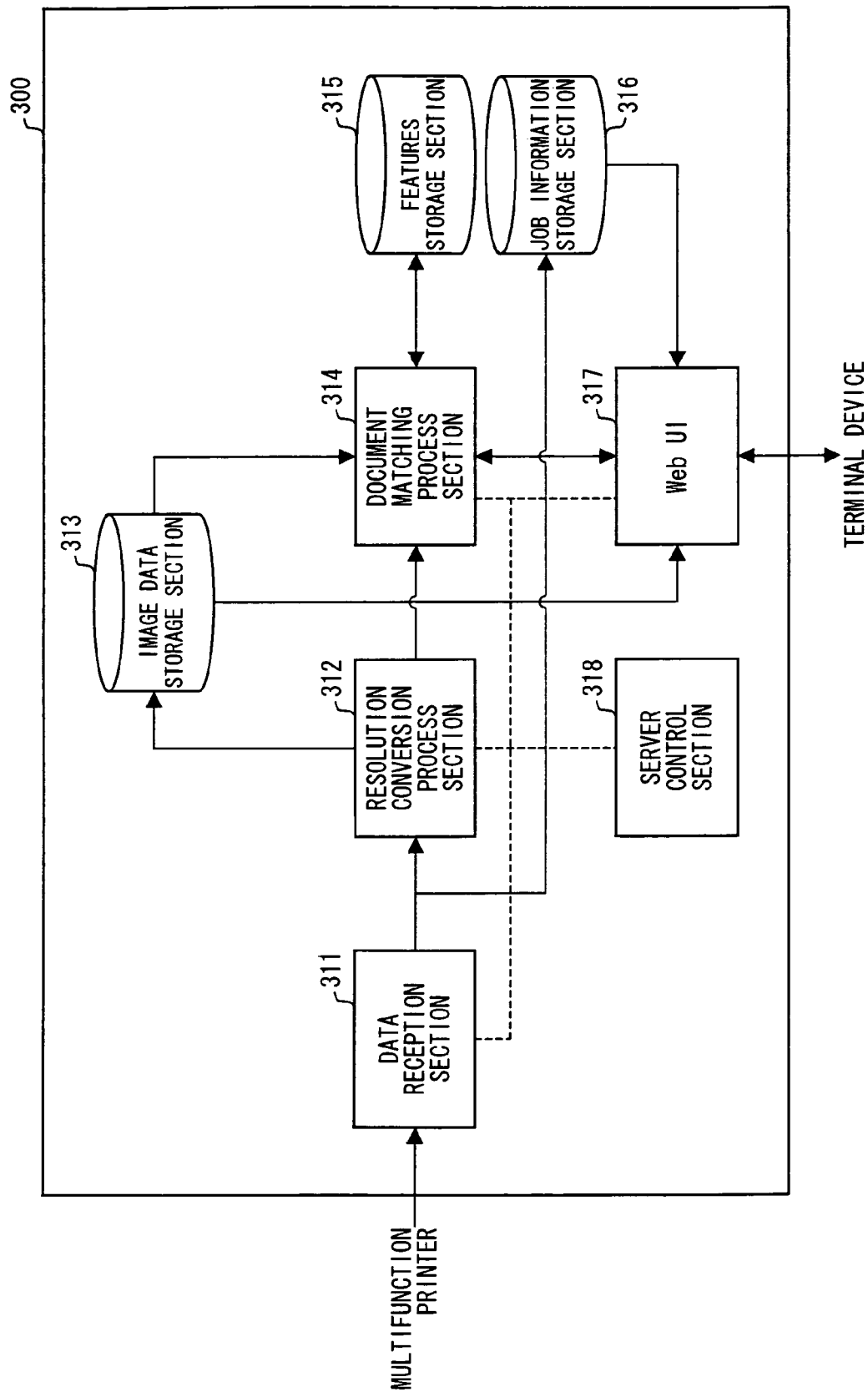
FIG. 1

FIG. 1 is a block diagram schematically illustrating a configuration of the server 300. As illustrated in FIG. 1, the server 300 includes a data reception section 311, a resolution conversion process section 312, an image data storage section 313, a document matching process section 314, a features storage section 315, a job information storage section 316, a Web UI 317, and a server 318.

The data reception section 311 receives image data and operation log information (time, the name of user, process mode, result of process etc.) for the image data from the multifunction printer 200.

The resolution conversion process section 312 converts resolution (e.g. 600 dpi) of an image received from the multifunction printer 200 into predetermined first resolution (e.g. 300 dpi) and outputs the image data of the first resolution to the document matching process section 314. Further, when the document matching process section 314 has extracted features of the image data of the first resolution and has stored the features, the resolution conversion process section 312 converts the first resolution of the image data into second resolution (e.g. 150 dpi) that is lower than the first resolution, and causes the image data of the second resolution to be stored in the image data storage section 313. The values of the first resolution and the second resolution are not limited to the above examples and may be set appropriately.

Examples of the method for converting resolution are not particularly limited and may include a nearest neighbor method, a bi-linear method, and a bi-cubic method. In the nearest neighbor method, the value of an existing pixel that is nearest to a pixel to be interpolated or the value of an existing pixel disposed in a predetermined position with respect to a pixel to be interpolated is regarded as the value of the pixel to be interpolated. In the bi-linear method, values of four existing pixels surrounding a pixel to be interpolated are weighted in proportion to distances between the pixel to be interpolated and the four pixels, respectively, an average of the weighted values is calculated, and the average is regarded as the value of the pixel to be interpolated. In the bi-cubic method, not only four pixels surrounding a pixel to be interpolated but also twelve pixels surrounding the four pixels, i.e. sixteen pixels in total, are used in interpolation calculation.

The image data storage section 313 stores image data of the second resolution that is outputted from the resolution conversion process section 312. The image data stored in the image data storage section 313 is used for display etc. when a user or a system administrator retrieves or browses operation log information.

When carrying out a process for storing an image, the document matching process section 314 calculates features of image data of the first resolution that is inputted from the resolution conversion process section 312, and causes the features and an image ID to be stored in the features storage section 315 in such a manner that the features are related to the image ID. When carrying out a process for extracting a similar image, the document matching process section 314 calculates features of image data of the second resolution that is inputted from the image data storage section 313, and carries out the process for extracting a similar image on the basis of the features of the image data of the second resolution and the features of the image data of the first resolution that are stored in the features storage section 315. The document matching process section 314 will be detailed later.

The features storage section 315 stores features of image data that are calculated by the document matching process section 314 and an image ID of the image data in such a manner that the features are related to the image ID.

The job information storage section 316 stores the image ID of the image data received from the multifunction printer 200 and operation log information for the image data in such a manner that the image ID is related to the operation log information. In the present embodiment, the operation log information is stored with respect to each job in the multifunction printer 200.

The Web UI 317 is an interface that allows communications with other devices via a Web browser. In the present embodiment, a request for retrieving a similar image transmitted from the terminal device 400 is received by the Web UI 317, and the result of the retrieval is transmitted to the terminal device 400 via the Web UI 317.

The server 318 controls performance of each section of the server 300.

Figure 4:
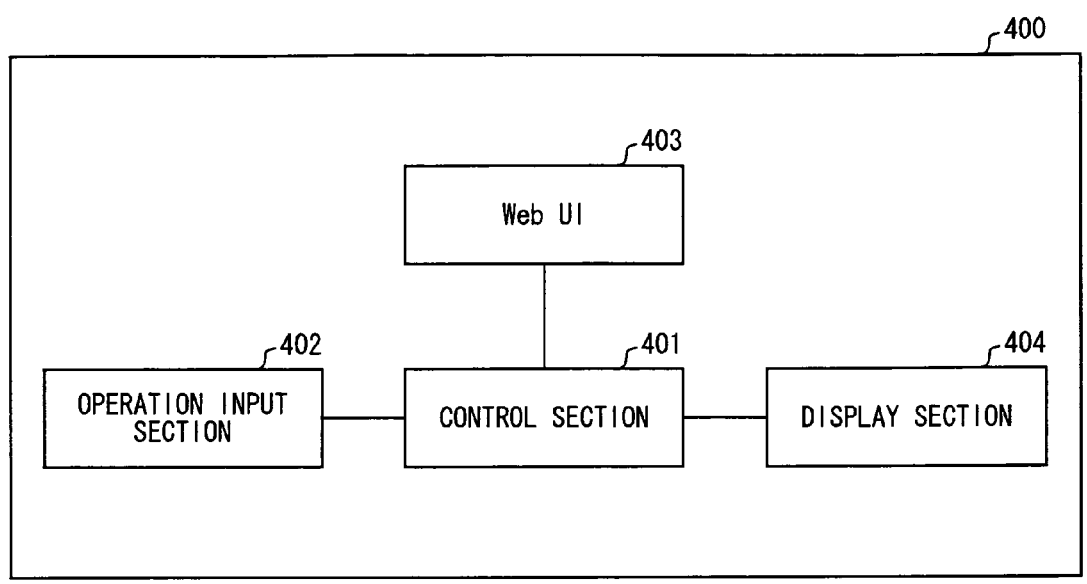
FIG. 4

FIG. 4 is a block diagram schematically illustrating a configuration of the terminal device 400. As illustrated in FIG. 4, the terminal device 400 includes a control section 401, an operation input section 402, a Web UI 403, and a display section 404.

The operation input section 402 receives instructions entered by the user. The operation input section 402 includes a keyboard and a pointing device such as a mouse and a pen input device, or includes a touch panel etc.

The Web UI 403 is an interface that allows communications with other devices via a Web browser.

The display section 404 displays information for assisting the user to enter instructions, and an image corresponding to image data. The display section 404 may be a liquid crystal display, a CRT display, a plasma display, and an organic EL display for example.

The control section 401 controls performance of each section of the terminal device 400 in response to instructions etc. entered by the user via the operation input section 402. The control section 401 includes a CPU etc.

In the present embodiment, the control section 401 acquires, from the server 300 and via the Web UI 403, image data of the second resolution that is stored in the image data storage section 313 of the server 300, and causes the display section 404 to display an image indicated by the image data. Then, the user selects via the operation input section 402 an image for which a similar image is retrieved, on the basis of the image data of the second resolution that is displayed by the display section 404. In response to the user's selection instruction, the control section 401 informs the server 300 of an image for which a similar image is sought (matching key image), and transmits via the Web UI 403 a similar image retrieval request for retrieving a matching reference image similar to the matching key image in the server 300.

Figure 5:
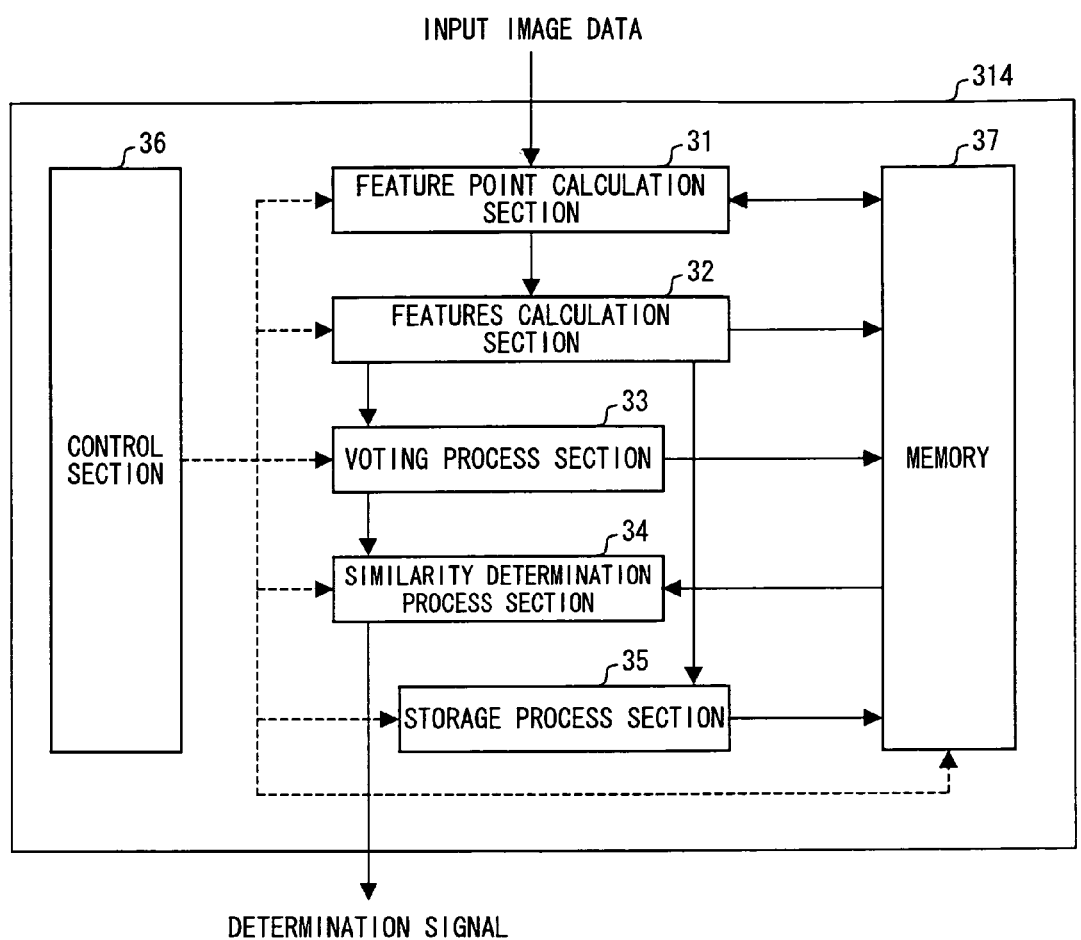
FIG. 5

The following explains the document matching process section 314. FIG. 5 is a block diagram illustrating an example of a configuration of the document matching process section 314. The document matching process section 314 in FIG. 5 includes a feature point calculation section 31, a features calculation section 32, a voting process section 33, a similarity determination process section 34, a storage process section 35, a control section 36, and a memory 37.

The control section 36 controls performance of each section of the document matching process section 314 and an access to the memory 37. The control section 36 may be included in a main control section (not shown) of the server 300 which main control section is provided for controlling performance of each section of the server 300. Alternatively, the control section 36 may be provided separately from the main control section, and cooperate with the main control section so as to control performance of the document matching process section 314.

The memory 37 is a memory in which various data used in processes of the sections of the document matching process section 314, the results of the processes etc. are stored.

The feature point calculation section 31 extracts connected portions of text strings or ruled lines from input image data (image data of the first resolution that is inputted from the resolution conversion process section 312 or image data of the second resolution that is read out from the image data storage section 313), and calculates the centroids of the connected portions as feature points. The feature point calculation section 31 also calculates coordinates of each feature point.

Figures 6, 7:
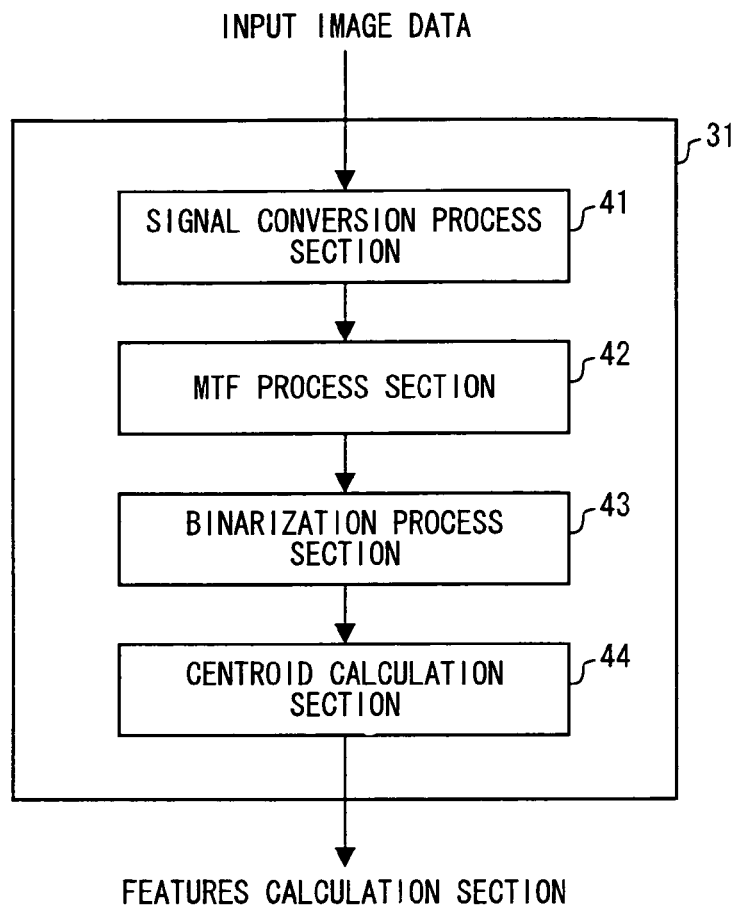
FIG. 6
FIG. 7

FIG. 6 is a block diagram schematically illustrating a configuration of the feature point calculation section 31. As illustrated in FIG. 6, the feature point calculation section 31 includes a signal conversion process section (achromatizing process section) 41, an MTF process section 42, a binarization process section 43, and a centroid calculation section 44.

When image data (RGB signals) inputted from the resolution conversion process section 312 or the image data storage section 313 is a color image, the signal conversion process section 41 achromatizes the input image data so as to convert the data into a brightness signal or a luminance signal.

For example, the signal conversion process section 41 converts the RGB signals into a luminance signal Y by the following equation (1).

$$Y_j = 0.30R_j + 0.59G_j + 0.11B_j \quad (1)$$

where $Y_j$ represents a luminance signal of each pixel and $R_j$, $G_j$, and $B_j$ represent color components of RGB signals each pixel, and j attached to R, G, and B represents a value assigned to individual pixels (j is an integer of 1 or more).

Alternatively, RGB signals may be converted into CIE1976L*a*b* signals (CIE: Commission International de l'Eclairage, L*: brightness, a*, b*: chromaticity).

The MTF process section 42 is used to cover (adjust) the influence due to differences in spatial frequency characteristics of an image input apparatus among plural kinds of image input apparatuses. In an image signal outputted from a CCD, MTF deterioration occurs due to an optical component such as a lens or a mirror, an aperture in a light-receiving surface of the CCD, transfer efficiency or afterimage, storage effect or scanning unevenness caused by physical scanning, and a similar cause. The MTF deterioration causes the scanned image to blur.

The MTF process section 42 carries out an appropriate filtering process (emphasizing process) so as to remove the blur caused by the MTF deterioration, and to suppress a high frequency component that is unnecessary for a feature point extraction process carried out by the centroid calculation section 44 in a later stage. Specifically, the MTF process section 42 uses a filter (not shown) to carry out an emphasizing process and a smoothing process. FIG. 7 illustrates examples of filter coefficients of the filter.

The binarization process section 43 compares achromatized image data (luminance value (luminance signal) or brightness value (brightness signal)) with a threshold value so as to binarize the image data.

The centroid calculation section 44 carries out labeling (labeling process) with respect to each pixel of the image data binarized by the binarization process section 43 (for example, image data represented by "1" or "0"). In the labeling, the same label is given to pixels with the same value out of two values. Further, a connected area made of pixels each having the same label is specified. A centroid of the specified connected area is extracted as a feature point, and the extracted feature point is outputted to the features calculation section 32. Note that the feature point is expressed by coordinate values (x coordinate, y coordinate) of a binary image.

Figure 8:
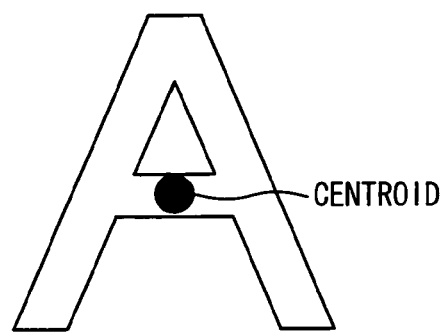
FIG. 8
Figure 9:
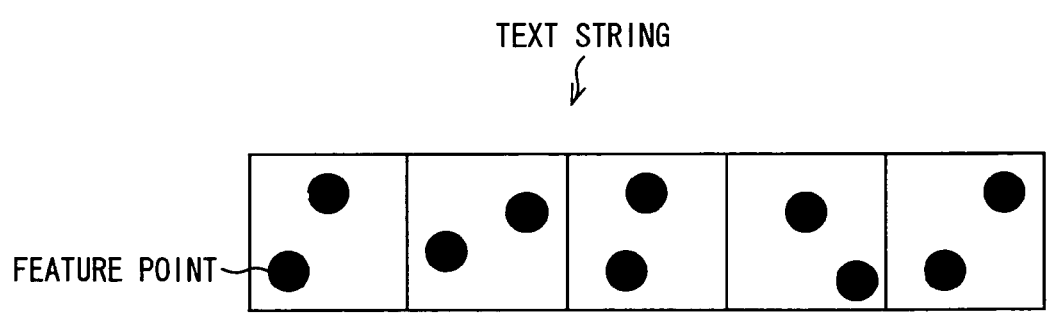
FIG. 9

FIG. 8 is an explanatory drawing illustrating examples of the connected area extracted from the input image data and a centroid of the connected area. In this figure, the connected area corresponding to a character. "A" and the centroid thereof are illustrated. Further, FIG. 9 is an explanatory drawing illustrating an example of centroids (feature points) of plural connected areas extracted from a text string included in the input image data.

The features (feature vectors) calculation section 32 calculates features (hash value and/or invariant) that are invariant to geometric transformation such as rotation, enlargement, reduction, parallel movement etc. of a document image.

Figure 10:
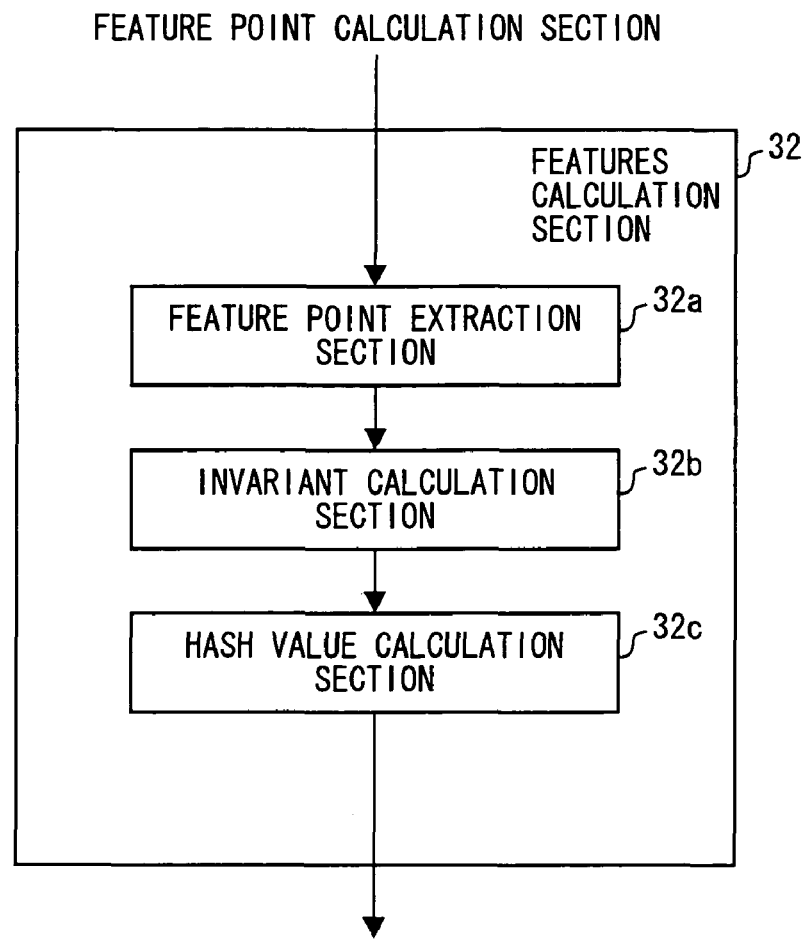
FIG. 10

FIG. 10 is a block diagram schematically illustrating a configuration of the features calculation section 32. As illustrated in FIG. 10, the features calculation section 32 includes a feature point extraction section 32a, an invariant calculation section 32b, and a hash value calculation section 32c.

Figure 11:
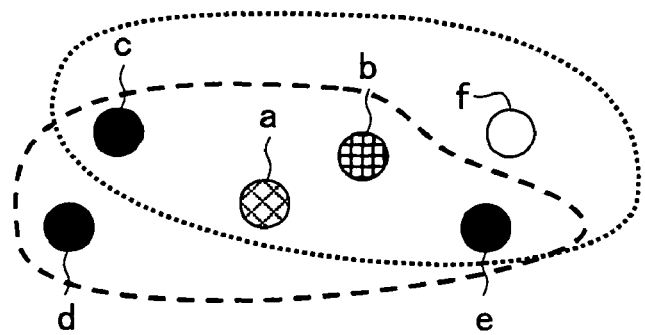
FIG. 11

As illustrated in FIG. 11, the feature point extraction section 32a regards only one feature point as a target feature point and sequentially extracts peripheral feature points around the target feature point in such order that a feature point nearer to the target feature point is more preferentially extracted so as to extract a predetermined number (4 in this case) of feature points. In the example of FIG. 11, four feature points b, c, d, and e are extracted as peripheral feature points in case where a feature point a is regarded as a target feature point, and four feature points a, c, e, and f are extracted as peripheral feature points in case where a feature point b is regarded as a target feature point.

Further, the feature point extraction section 32a extracts a combination of three points which can be selected from the four peripheral feature points extracted in the foregoing manner. For example, as illustrated in FIGS. 12(a) to 12(d), in case where the feature point a in FIG. 11 is regarded as a target feature point, a combination of three peripheral feature points out of the peripheral feature points b, c, d, and e, that is, a combination of the peripheral feature points b, c, and d, a combination of the peripheral feature points b, c, and e, a combination of the peripheral feature points b, d, and e, and a combination of the peripheral feature points c, d and e are extracted.

Next, the invariant calculation section 32b calculates an invariant (one of features) Hij relative to geometrical transformation, with respect to each combination extracted in the foregoing manner.

Herein, "i" represents the number of target feature point(s) (i is an integer not less than 1), and "j" represents the number of combinations of three peripheral feature points (j is an integer not less than 1). In the present embodiment, a ratio of lengths of two lines connecting the peripheral feature points is set as the invariant Hij.

The lengths of the lines are calculated in accordance with coordinates of the peripheral feature points. For example, in FIG. 12(a), when a length of a line connecting the feature point b and the feature point c is A11 and a length of a line connecting the feature point b and the feature point d is B11, the invariant H11 is such that H11=A11/B11.

Figure 12:
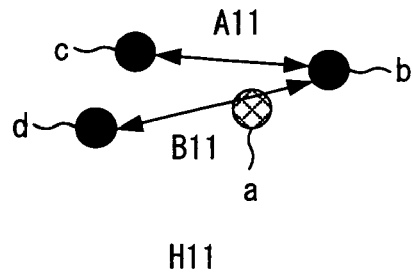
FIG. 12(a) to 12(d)
Figure 12:
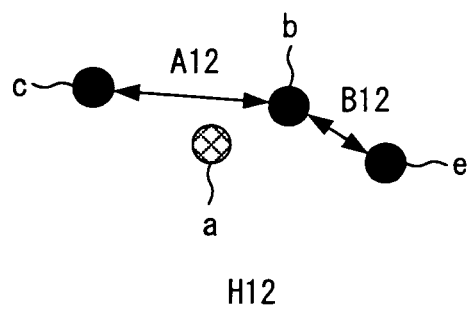
Figure 12:
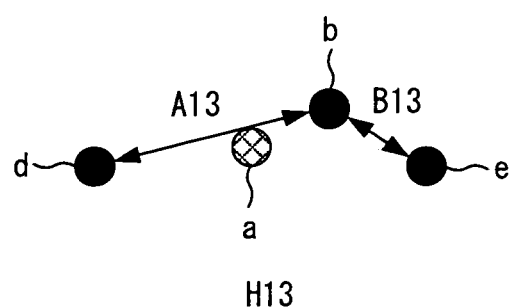
Figure 12:
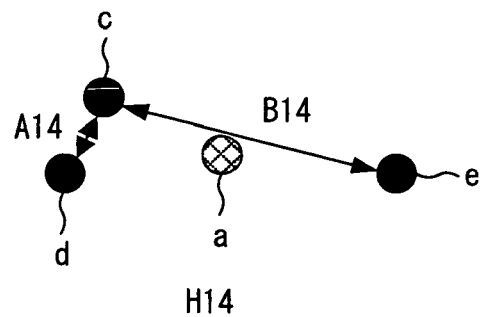
Figure 13:
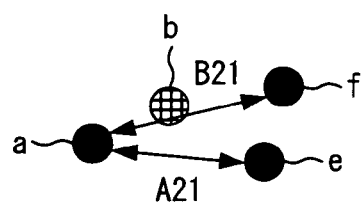
FIG. 13(a) to 13(d)
Figure 13:
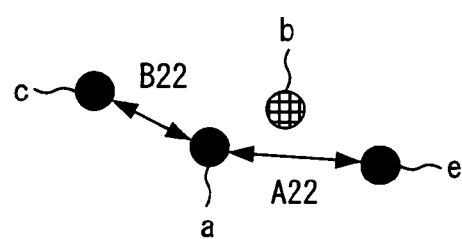
Figure 13:
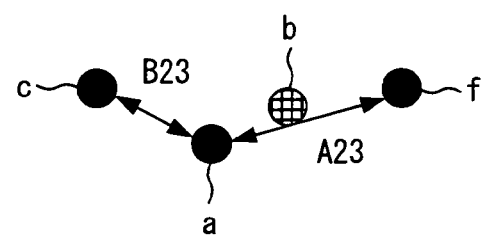
Figure 13:
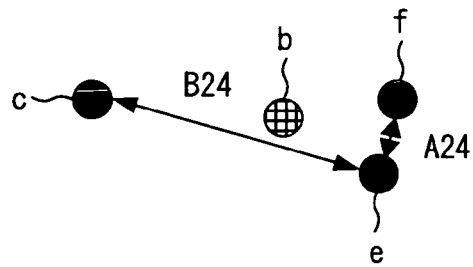

Further, in FIG. 12(b), when a length of a line connecting the feature point b and the feature point c is A12 and a length of a line connecting the feature point b and the feature point e is B12, the invariant H12 is such that H12=A12/B12. Further, in FIG. 12(c), when a length of a line connecting the feature point b and the feature point d is A13 and a length of a line connecting the feature point b and the feature point e is B 13, the invariant H13 is such that H13=A13/B13. Further, in FIG. 12(d), when a length of a line connecting the feature point c and the feature point d is A14 and a length of a line connecting the feature point c and the feature point e is B14, the invariant H14 is such that H14=A14/B14. In this manner, the invariants H11, H12, H13, and H14 are calculated in the examples illustrated in FIGS. 12(a) to 12(d).

Note that, in the foregoing examples, a line connecting a peripheral feature point positioned closest to the target feature point and a peripheral feature point positioned second-closest to the target feature point is indicated as Aij and a line connecting a peripheral feature point positioned closest to the target feature point and a peripheral feature point positioned third-closest to the target feature point is indicated as Bij, but the definition is not limited to this, and the lines used to calculate the invariant Hij may be set in any manner.

The hash value calculation section 32c calculates a remainder of the following expression as a hash value (one of features) Hi and causes the calculated Hi to be stored in the memory 37.

$$Hi=(Hi1\times 10^3+Hi2\times 10^2+Hi3\times 10^1+Hi4\times 10^0)/D$$

where D is a constant number which is set beforehand according to a remainder value range.

How to calculate the invariant Hij is not particularly limited. For example, a value calculated in accordance with a cross-ratio of five points in the vicinity of the target feature point, or a value calculated in accordance with a cross-ratio of five points extracted from n points in the vicinity of the target feature point (n is such an integer that n≧5), or a value calculated in accordance with an arrangement of m points extracted from n points in the vicinity of the target feature point (m is such an integer that m<n and m≧5) and a cross-ratio of five points extracted from the m points may be set as the invariant Hij relative to the target feature point. Note that, the cross-ratio is a value calculated from four points in a straight line or from five points on a plane and is known as an invariant relative to projective transformation which is a kind of geometric transformation.

Further, an expression for calculating the hash value Hi is not limited to the foregoing expression, and other hash function may be used.

When extraction of peripheral feature points around a target feature point and calculation of the hash value Hi are completed, each section of the features calculation section 32 focuses on another feature point to change the target feature point and extracts peripheral feature points and calculates a hash value. In this manner, each section of the features calculation section 32 calculates hash values corresponding to all the feature points.

In FIG. 11, when extraction of peripheral feature points around the feature point a regarded as a target feature point and calculation of a hash value are completed, peripheral feature points around the feature point b regarded as a target feature point are extracted and a hash value is calculated. In FIG. 11, four feature points a, c, e, and f are extracted as peripheral feature points in case where the feature point b is regarded as a target feature point.

Further, as illustrated in FIGS. 13(a) to 13(d), a combination of three points (peripheral feature points a, e, and f, peripheral feature points a, e, and c, peripheral feature points a, f, and c, and peripheral feature points e, f, and c) selected from the peripheral feature points a, c, e, and f is extracted and a hash value Hi corresponding to the combination is calculated, and the calculated hash value Hi is stored in the memory 37. Further, this process is repeated so as to correspond to the number of the feature points, thereby calculating hash values corresponding to the respective feature points each of which is regarded as the target feature point. Then, the calculated hash values are stored in the memory 37.

In case of storing the image data, that is, in case where the image data from which features are extracted is image data of the first resolution that is inputted from the resolution conversion process section 312, the features calculation section 32 transmits, to the storage process section 35, the hash value (features) calculated in the foregoing manner and corresponding to each feature point and coordinates of each feature point that are calculated by the feature point calculation section 31. In this case, the processes by the voting process section and the similarity determination process section are not carried out.

In case of a process for matching image data, that is, in case where image data from which features are extracted is image data of the second resolution that is read out from the image data storage section 313, the features calculation section 32 transmits, to the voting process section 33, the hash value (features) calculated in the foregoing manner and corresponding to each feature point and coordinates of each feature point that are calculated by the feature point calculation section 31.

The storage process section 35 causes (i) hash values (features) calculated by the features calculation section 32 and corresponding to the respective feature points and (ii) indices (image IDs) each indicative of an image of image data for which a hash value is calculated to be stored in the memory 37 in such a manner that the hash values are related to the indices (see FIG. 14(a)). In case where the hash values have already been stored, the IDs are stored in such a manner as to correspond to the hash values. IDs are serially assigned to respective documents without any duplication.

Note that, in case where the number of documents stored in the memory 37 is larger than a predetermined value (for example, 80% of the number of images which can be stored), old IDs may be retrieved and sequentially deleted. Further, the deleted IDs may be reused as IDs of new input image data. Further, in case where the calculated hash values are identical with each other (H1=H5 in FIG. 14(b)), these values may be collectively stored into the hash table.

In FIG. 14(b), H1=H5 and these values are collectively stored in the hash table. Among the values stored in the hash table, when a hash value calculated from image data includes H1, the document ID1 is voted for two times.

As illustrated in FIG. 15, the storage process section 35 causes identifiers of feature points of image data (indices indicative of the feature points) and coordinates of the feature points to be stored in the memory 37 in such a manner that the identifiers are related to the coordinates.

The voting process section 33 compares the hash values of feature points of a matching key image with the hash values of matching reference images that are images stored in the memory 37 and that are other than the matching key image, and votes for matching reference images having the same hash values as those of the matching key image. A method for the matching determination process may be a method described in Non-Patent Literature 1. The matching key image is an image corresponding to an image ID specified by a similar image retrieval request received from the terminal device 400. The matching key image includes an image of the second resolution that is stored in the image data storage section 313 and an image of the first resolution whose features are stored in the features storage section 315. That is, in the present embodiment, the voting process section 33 performs (i) a voting process based on features of the matching key image of the second resolution which corresponds to the image ID specified by the similar image retrieval request and which is stored in the image data storage section 313 and (ii) a voting process based on features of the matching key image of the first resolution which corresponds to the image ID specified by the similar image retrieval request and whose features are stored in the features storage section 315.

Figure 17:
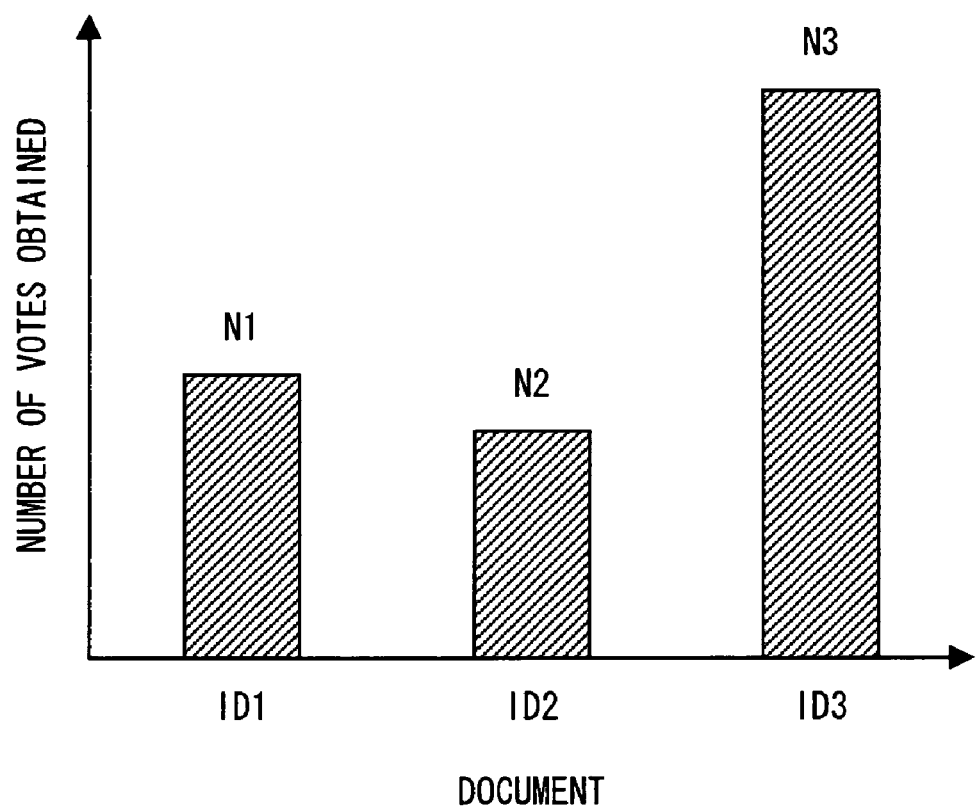
FIG. 17

As illustrated in FIG. 16, the voting process section 33 stores, in the memory 37, which feature points of which matching reference image are voted for by feature points p1, p2, . . . of a matching key image. In FIG. 16, it is determined that a feature (hash value) for the feature point p1 of the matching key image corresponds to a feature of the feature point f1 of a matching reference image ID1, and that a feature (hash value) for the feature point p2 of the matching key image corresponds to a feature of the feature point f2 of a matching reference image ID3. FIG. 17 is a graph showing examples of results of voting (number of votes) for the matching reference images ID1, ID2, and ID3.

On the basis of the results of two voting by the voting process section 33, that is, the results of the voting process based on features of the matching key image of the first resolution and the voting process based on features of the matching key image of the second resolution, the similarity determination process section 34 calculates a similarity between the matching key image and individual matching reference images.

For example, on the basis of the results of the two voting, the similarity determination process section 34 determines that a matching reference image with larger number of votes obtained has a higher similarity to the matching key image. In this case, the similarity can be determined by sorting according to the number of votes obtained.

Alternatively, the similarity determination process section 34 divides (i) the number of votes obtained for a matching reference image as a result of the voting by the voting process section 33 by (ii) the maximum number of votes obtainable for the matching reference image and normalizes the value resulting from the division so as to determine a similarity on the basis of the normalized value. Use of the normalized value allows proper evaluation of a similarity even in a case of a matching reference image with the small number of feature points.

The maximum number of votes obtainable for the matching reference image is represented by multiplying the number of feature points by the number of hash values calculated from one feature point (target feature point). In the present embodiment, a single hash value is calculated for a single feature point, but the present invention is not limited to this example. A plurality of hash values may be calculated for a single feature point. For example, assume that six points are extracted as peripheral feature points around the target feature point. There are six combinations of extracting five points from the six points. Three points are extracted from the five points for each of the six combinations, so as to calculate an invariant, thereby calculating a hash value. In this case, six hash values are calculated with respect to one feature point.

In a case of an N in 1 document, the original documents are reduced and rotated. Therefore, the present invention may be arranged so that positioning of feature points of a matching reference image and feature points of a matching key image is performed and a similarity between the matching reference image and the matching key image is determined based on the result of the voting process and the result of the positioning. In this case, an image with more than the predetermined number of votes obtained (e.g. 80% or more in case of normalized value) is determined as having a high similarity, and only an image with the small number of votes obtained is subjected to positioning of feature points, and then it is determined whether the image is similar or not. This allows accurately picking up an image partially corresponding to the matching key image. For example, in a case where the matching key image is a copy of an image obtained by cutting out a part of a matching reference image where important data exists, it is possible to pick up the matching reference image including the part where the important data exists by the matching process.

Specifically, by use of preliminary stored coordinates of feature points of matching reference images as illustrated in FIG. 15, the voting process section 33 calculates positional relationships between feature points of a matching key image and feature points of a matching reference image, and causes the coordinate system of the feature points of the matching reference image and the coordinate system of the feature points of the matching key image to correspond to each other.

For example, in a case where a matching key image is determined as being similar to a matching reference image ID1 in FIG. 16, coordinates of feature points of the matching reference image ID1 with respect to the coordinate system of the matching reference image ID1 are converted into coordinates of feature points of a matching key image with respect to the coordinate system of the matching key image. Table 1 shows correspondences between the coordinates of the feature points in the two coordinate systems.

TABLE 1

| | Coordinates of feature points of matching key image | Coordinates of feature points of matching reference image |
|---|---|---|
| 1 | (x1, y1) | (x1', y1') |
| 2 | (x2, y2) | (x2', y2') |
| 3 | (x3, y3) | (x3', y3') |
| 4 | (x4, y4) | (x4', y4') |

Assume that Pin represents a matrix for coordinates of the feature points in the coordinate system of the matching reference image, Pout represents a matrix for coordinates of the feature points in the coordinate system of the matching key image, and A represents a conversion coefficient for the two matrices, the following equation is satisfied.

$$Pout = \begin{pmatrix} x1 & y1 & 1 \\ x2 & y2 & 1 \\ x3 & y3 & 1 \\ x4 & y4 & 1 \end{pmatrix},$$

$$Pin = \begin{pmatrix} x1' & y1' & 1 \\ x2' & y2' & 1 \\ x3' & y3' & 1 \\ x4' & y4' & 1 \end{pmatrix},$$

$$A = \begin{pmatrix} a & b & c \\ d & e & f \\ g & h & i \end{pmatrix}$$

$$Pout = Pin \times A$$

Since Pin is not a square matrix, both sides of Pin are multiplied with $Pin^T$ that is a transposed matrix of the Pin, and are further multiplied with an inverse matrix of $Pin^T Pin$.

$$Pin^T Pout = Pin^T Pin \times A$$

$$(Pin^T Pin)^{-1} Pin^T Pout = A$$

Figure 18:
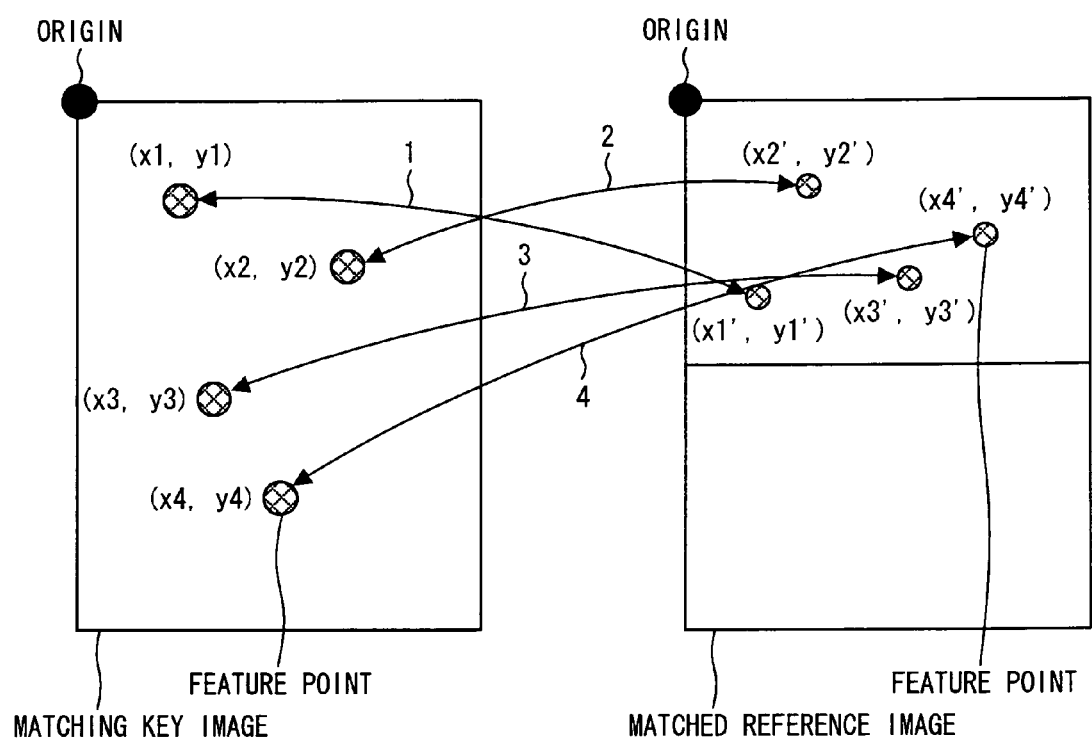
FIG. 18

As illustrated in FIG. 18, by use of the conversion coefficient A thus obtained, any coordinates (xi, yj) in the coordinate system of the matching reference image can be converted into coordinates (xi', yj') in the coordinate system of the matching key image by use of the conversion coefficient A as indicated by the following expression.

$$(x', y', 1) = (x, y, 1) \times A$$

Among images with a high similarity as described above, it is possible to obtain coordinate systems of respective images by similar transformation. On the other hand, when it is difficult to obtain the conversion coefficient A unlike the above (e.g. when the conversion coefficient A does not converge), it is possible to determine that the two images do not similar to each other.

The voting process section 33 may carry out the coordinate conversion process in such a manner as to exclude the influence of an outlier. The outlier is a point that has been wrongly determined as a feature point at which features (hash values) of a matching key image and features (hash values) of a matching reference image correspond to each other.

In the coordinate conversion process, when the outlier exists, the calculated coordinate conversion coefficient greatly differs from the original coordinate conversion coefficient. For that reason, the coordinate conversion coefficient is calculated by an estimation method used when the outlier exists, such as robust estimation. The following explains a case of calculating the coordinate conversion coefficient by use of LMedS standard out of the robust estimation.

Initially, three sets of feature points are randomly extracted from sets of feature points that have been extracted as feature points at which features (hash values) of the matching key image and features (hash values) of the matching object image correspond to each other. In this case, Pout2 represents a matrix for coordinates of feature points of the matching key image, Pin2 represents a matrix for coordinates of feature points of the matching reference image, and A2 represents a conversion coefficient.

$$Pin2 = \begin{pmatrix} x1 & y1 & 1 \\ x2 & y2 & 1 \\ x3 & y3 & 1 \end{pmatrix},$$

$$Pout2 = \begin{pmatrix} x1' & y1' & 1 \\ x2' & y2' & 1 \\ x3' & y3' & 1 \end{pmatrix},$$

$$A2 = \begin{pmatrix} a & b & c \\ d & e & f \\ g & h & i \end{pmatrix}$$

The relation between the conversion coefficient A2 and the feature point (Pout2, Pin2) is represented by the following expression.

$$Pout2 = Pin2 \times A2$$

Consequently, the conversion coefficient A2 can be obtained by the following expression.

$$A2 = Pin2^{-1} Pout2$$

Subsequently, by use of the conversion coefficient A2 thus calculated, coordinates of all sets of feature points that are extracted as feature points at which features (hash values) of the matching key image and features (hash values) of the matching reference image correspond to each other are converted, and errors between coordinates obtained by the conversion and actual coordinates are calculated. Then, a central value at the time when the calculated errors are sorted in the order of largeness is regarded as an evaluation value for the conversion coefficient A. The "coordinates obtained by the conversion" are, for example, values (coordinate values) obtained by converting coordinates of feature points of the matching reference image in a case where the coordinate system of the matching reference image is caused to correspond to the coordinate system of the matching key image. The "actual coordinates" are coordinate values of the matching key image that correspond to the coordinates.

As described above, sets of feature points at which features (hash values) of the matching key image and features (hash values) of the matching reference image correspond to each other are randomly extracted, the conversion coefficient is calculated, and the evaluation value is determined. This process is repeated several times. The conversion coefficient at which the calculated evaluation coefficient is the smallest is regarded as a desired conversion coefficient.

Figure 19:
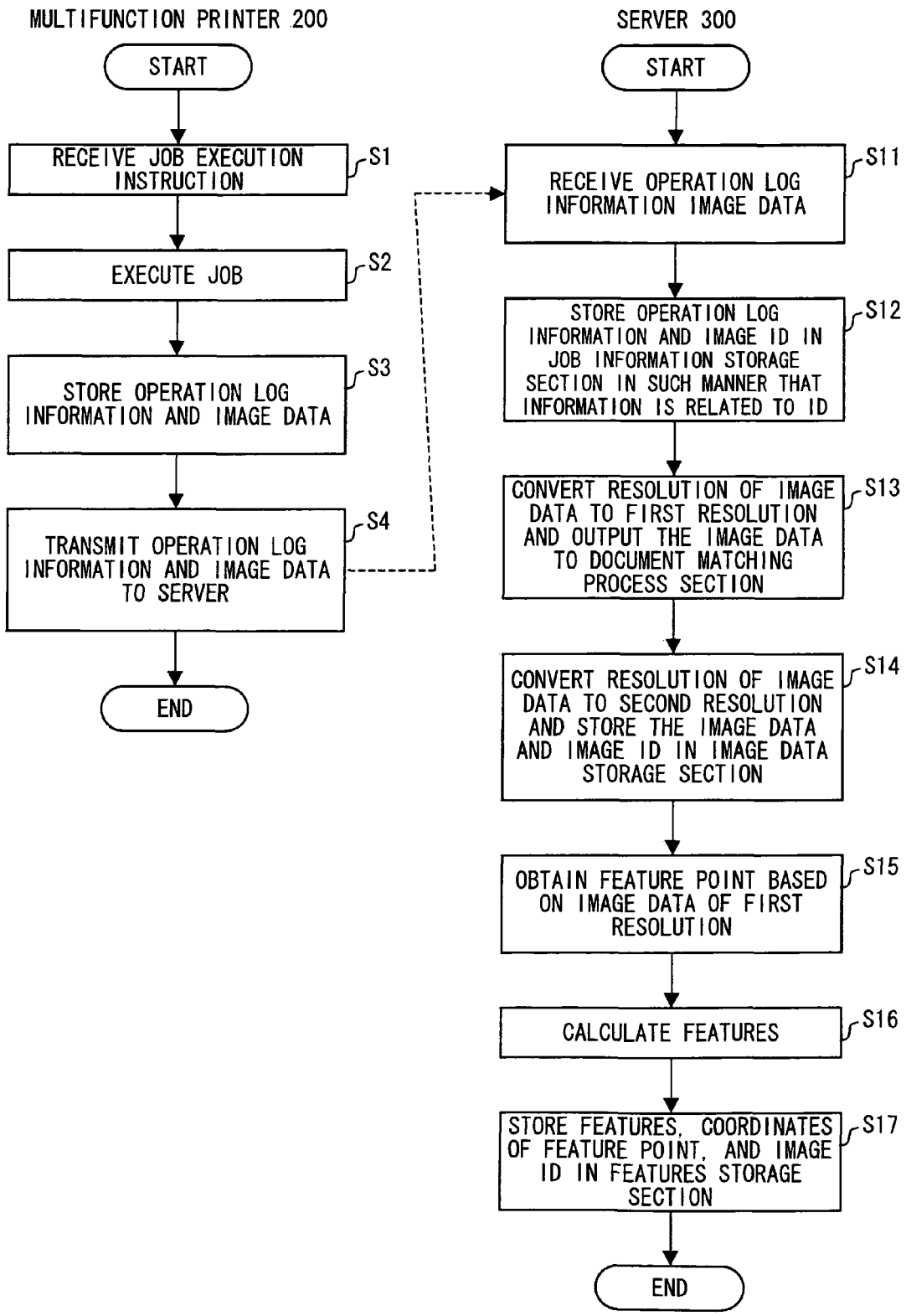
FIG. 19

The following explains a flow of a process by the image processing system 100. Initially, an explanation is made as to a flow of a process when carrying out a features storage process. FIG. 19 is a flowchart showing a flow of the features storage process.

When receiving a job execution instruction from a user via the operation panel 6 or the communication device 6 (S1), the main control section of the multifunction printer 200 executes the job for image data in response to the job execution instruction (S2). The main control section of the multifunction printer 200 causes operation log information of the executed job and image data to be stored in the memory (not shown) (S3). Further, the main control section of the multifunction printer 200 transmits the operation log information and the image data to the server 300 (S4). The operation log information may include a time at which the image data is processed, the name of a user, the process mode, the result of the process etc.

When the data reception section 311 receives operation log information and image data that are transmitted from the multifunction printer 200 (S1), the server control section (storage process section) 318 assigns an image ID to the received image data, and causes the image ID and the operation log information to be stored in the job information storage section 316 in such a manner that the image ID and the operation log information are related to each other (S12).

Further, the server control section 318 controls the resolution conversion process section 312 to convert the resolution of the image data received by the data reception section 311 into the first resolution (herein, 300 dpi) that has been predetermined, and to output the image data of the first resolution to the document matching process section 314 (S13), and to convert the resolution of the image data into the second resolution (herein, 150 dpi) that has been predetermined, and to cause the image data of the second resolution and the image ID to be stored in the image data storage section 313 in such a manner that the image data of the second resolution is related to the image ID (S14).

Then, the server control section 318 controls the document matching process section 314 to calculate feature points and coordinates of the feature points of the image data of the first resolution (S15) and to calculate features of the image data (S16). Then, the server control section 318 causes the coordinates of the feature points and the features that have been calculated in S15 and S16 respectively and the image ID to be stored in the features storage section 315 in such a manner that the coordinates of the feature points and the features are related to the image ID (S17), and finishes the features storage process.

Figure 20:
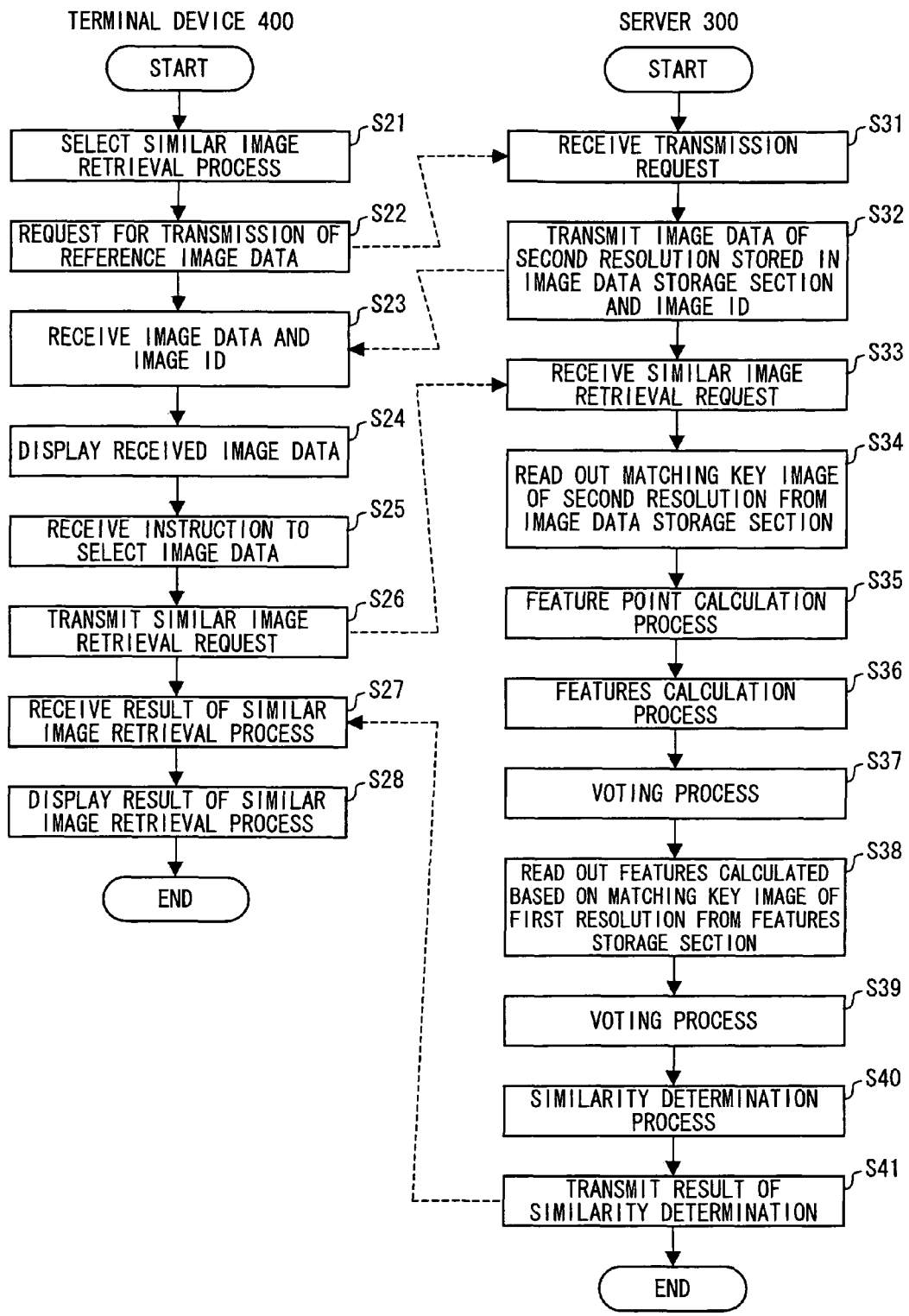
FIG. 20

The following explains a flow of the similar image retrieval process. FIG. 20 is a flowchart showing a flow of the similar image retrieval process.

When receiving a user's instruction to select a similar image retrieval process mode via the operation input section 402 (S21), the control section 401 of the terminal device 400 transmits, to the server 300 via the Web UI 403, a request for transmission of reference image data (S22).

When the Web UI 317 receives the request for transmission of reference image data from the terminal device 400 (S31), the server control section 318 of the server 300 reads out image data of the second resolution and image IDs for the image data that are stored in the image data storage section 313, and transmits the image data and the image IDs to the terminal device 400 (S32).

When the Web UI 403 receives the image data and the image IDs from the server 300 (S23), the control section 401 of the terminal device 400 causes the display section 404 to display an image corresponding to the received image data (S24). How to display is not particularly limited. For example, image data may be sequentially displayed one by one, or a plurality of image data may be displayed at once, or a list of image data may be displayed by use of thumbnail images.

Thereafter, when the control section 401 of the terminal device 400 receives a user's instruction to select an image via the operation input section 402 (S25), the control section 401 transmits, to the server 300 via the Web UI 403, a similar image retrieval request that specifies the image ID of the selected image (S26).

When the Web UI 317 receives the similar image retrieval request from the terminal device 400 (S33), the server control section 318 of the server 300 reads out, from the image data storage section 313, image data of the second resolution that corresponds to the image ID specified by the similar image retrieval request (S34), and causes the document matching process section 314 to carry out, on the basis of the read out image data, a feature point calculation process (S35), a features calculation process (S36), and a voting process (S37) for matching reference images whose features are stored in the features storage section 315.

Then, the server control section 318 of the server 300 reads out, from the features storage section 315, features calculated from image data of the first resolution that corresponds to the image ID specified by the similar image retrieval request (S38), and causes the document matching process section 314 to carry out, on the basis of the read out features, a voting process for matching reference images whose features are stored in the features storage section 315 (S39).

Thereafter, the server control section 318 of the server 300 causes the document matching process section 314 to carry out a similarity determination process on the basis of the result of the voting process based on the image data of the second resolution and the result of the voting process based on features calculated from the image data of the first resolution (S40). An example of the similarity determination is such that the number of votes based on the image data of the second resolution and the number of votes based on the features calculated from the image data of the first resolution are added to each other with respect to each matching reference image, and it is determined that higher additional value indicates a higher similarity. Then, the result of the similarity determination process is transmitted to the server 400 via the Web UI 317 (S41), and the process is finished. The present invention may be arranged so as to inform the terminal device 400 of only image data with the largest number of votes obtained (or image data with the highest similarity), or may be arranged so as to inform the terminal device 400 of all image data with more than the predetermined number of votes obtained (or image data with more than the predetermined similarity).

When the Web UI 403 receives the result of the similarity determination from the server 300 (S27), the control section 401 of the terminal device 400 causes the display section 404 to display the result of the similarity determination (S28), and finishes the process.

As described above, in the image processing system 100 of the present embodiment, features calculated from image data of the first resolution are stored in the features storage section 315, and the image data of the second resolution that is obtained by converting the image data of the first resolution to the second resolution lower than the first resolution is stored in the image data storage section 313.

When receiving the similar image retrieval request for a matching key image, image data of the second resolution for the matching key image is read out from the image data storage section 313, and there are carried out the feature point calculation process, the features calculation process, and the voting process based on the image data of the second resolution. Further, features calculated from image data of the first resolution for the matching key image are read out from the features storage section 315 and the voting process is carried out based on the read out features. Then, the similarity determination process is carried out based on the result of the voting process based on the image data of the second resolution and the result of the voting process based on the image data of the first resolution.

Thus, the similarity determination process is carried out based on the image data with plural resolutions for the matching key image. This increases accuracy in the similarity determination process.

Further, in a system wherein when the multifunction printer 200 executes a job such as copy, printing, scan, and FAX, job information is stored as a log having a processed image in a server to allow an administrator to check what data is outputted or transmitted at what time and by whom, features extracted from image data with high resolution (first resolution) and image data with low resolution (second resolution) are stored so as to allow a similar image retrieval process on the basis of both features extracted from image data with high resolution and features extracted from image data with low resolution if necessary. This allows an accurate matching process even when a matching key image or a matching reference image is an N-up document or an image having been enlarged or reduced. Further, by storing an image with low resolution (second resolution), it is possible to reduce storage capacity necessary for each image data, and it is possible to actually compare image data if necessary to confirm whether the result of matching is appropriate or not.

In the present embodiment, the voting process based on image data of the second resolution and the voting process based on image data of the first resolution are always carried out. However, the present invention is not limited to this. For example, the present invention may be arranged so that only when the voting process based on image data with one of the two resolutions does not allow retrieval of a similar image, the voting process based on image data with the other of the two resolutions is carried out.

In the present embodiment, image data of the second resolution is stored in the image data storage section 313. Alternatively, the present invention may be arranged so that image data inputted to the data reception section 311 is stored with the original resolution or image data of the first resolution is stored, and the image data is changed to the second resolution when carrying out the similarity determination process.

In the present embodiment, the voting process based on image data of the second resolution is first carried out and then the voting process based on image data of the first resolution is carried out. Alternatively, the present invention may be arranged so that the voting process based on image data of the first resolution is first carried out and then the voting process based on image data of the second resolution is carried out, or that the voting process based on image data of the first resolution and the voting process based on image data of the second resolution are carried out simultaneously.

In the present embodiment, an explanation was made as to a case where a matching key image is selected from images stored in the image data storage section of the server 300. Alternatively, the present invention may be arranged so that the terminal device 400 or the multifunction printer 200 transmits a matching key image to the server 300.

For example, the present invention may be arranged so that when a user has an original document (paper document) of a matching key image, the user causes the multifunction printer 200 to scan the original document (or to execute a job for the original document) and to transmit an image of the original document to the server 300 so that the matching key image is taken into the server 300 and the feature point calculation process, the features calculation process, and the voting process are carried out based on an image obtained by converting the matching key image to the first resolution and on an image obtained by converting the matching key image to the second resolution. Alternatively, the present invention may be arranged so that image data for a matching key image is transmitted from the terminal device 400 to the server 300 and the feature point calculation process, the features calculation process, and the voting process are carried out based on an image obtained by converting the matching key image to the first resolution and on an image obtained by converting the matching key image to the second resolution.

In the present embodiment, the resolution conversion process section 312 and the document matching process section 314 are included in the server 300. Alternatively, the present invention may be arranged so that both of or one of the resolution conversion process section 312 and the document matching process section 314 are included in the multifunction printer 200. For example, the present invention may be arranged so that the resolution conversion process section 312 and the document matching process section 314 are included in the multifunction printer 200 and when a job is executed, the multifunction printer 200 carries out a process for generating operation log information, a process for converting image data used in the job to the first resolution so as to calculate coordinates of a feature point and features, and a process for converting the image data to the second resolution, and the operation log information, the coordinates of a feature point and features that are calculated based on image data of the first resolution, and image data of the second resolution are transmitted to the server 300. In this case, the server 300 assigns an image ID to (i) coordinates of a feature point and features that have been received from the multifunction printer 200 connected via the network and (ii) image data of the second resolution, and causes the image ID and the coordinates of the feature point and the features to be stored in the features storage section 315 in such a manner that the image ID is related to the coordinates of the feature point and the features, and causes the image ID and the image data of the second resolution to be stored in the image data storage section 313 in such a manner that the ID is related to the image data of the second resolution. When the multifunction printer 200 requests the similar image retrieval process, the server 300 transmits, to the multifunction printer 200, (i) the image ID and the coordinates of the feature point and the features that are stored in the features storage section 315 and (ii) the image ID and the image data of the second resolution that are stored in the image data storage section 313. Thus, the document matching process section 314 included in the multifunction printer 200 carries out the similar image retrieval process.

In the present embodiment, an explanation was made as to a case where the multifunction printer 200 and the server 300 are communicably connected with each other via the network. Alternatively, the present invention may be arranged so that the resolution conversion process section 312, the document matching process section 314, the image data storage section 313, the features storage section 315, and the job information storage section 316 are included in the multifunction printer 200 and operations of these sections are controlled by the main control section of the multifunction printer 200 in the same manner as the server control section 318.

Figure 21:
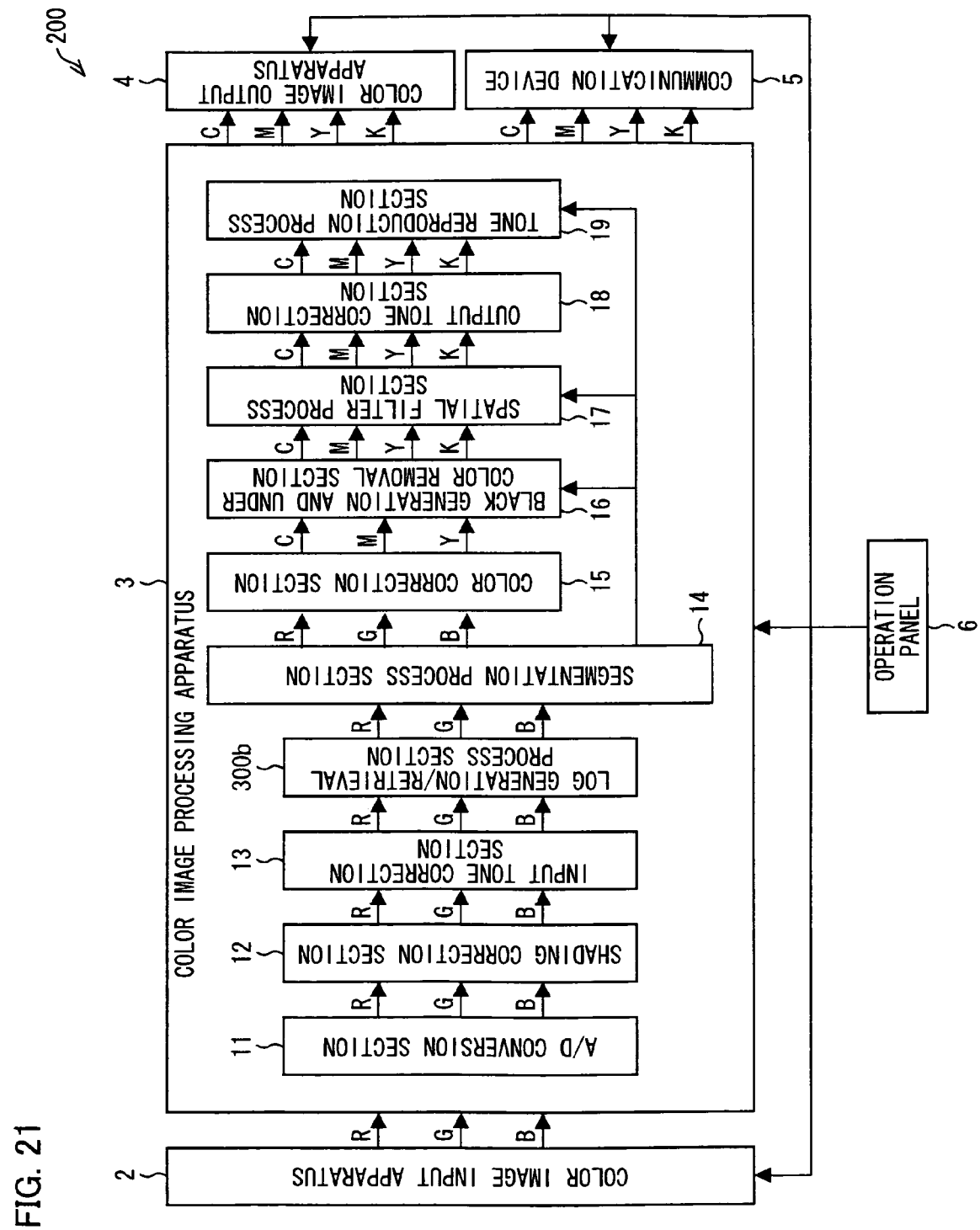
FIG. 21

FIG. 21 is a block diagram illustrating an example of a configuration of the multifunction printer 200. In the example shown in FIG. 21, in addition to the configuration of the example shown in FIG. 3, a log generation/retrieval process section 300b is provided between the input tone correction section 13 and the segmentation process section 14. The log generation/retrieval process section 300b has substantially the same configuration as that of the server 300 and therefore explanation thereof is omitted here.

When a job is executed in the multifunction printer 200, the main control section of the multifunction printer 200 carries out the following processes.

(1) Assigning an image ID to image data used in the job.

(2) Causing operation log information used in the job and the image ID to be stored in the job information storage section 316 included in the log generation/retrieval process section 300b in such a manner that the operation log information is related to the image ID.

(3) Causing the resolution conversion process section 312 included in the log generation/retrieval process section 300b to convert resolution of the image data used in the job into the first resolution, causing the document matching process section 314 included in the log generation/retrieval process section 300b to calculate a feature point, coordinates of the feature point, and features on the basis of the image data of the first resolution, and causing the features and the coordinates of the feature point that are thus calculated and an image ID to be stored in the features storage section 315 included in the log generation/retrieval process section 300b in such a manner that the features and the coordinates of the feature point are related to the image ID.

(4) Causing the resolution conversion process section 312 included in the log generation/retrieval process section 300b to convert resolution of the image data used in the job into the second resolution, and causing the image data of the second resolution and the image ID to be stored in the image data storage section 313 included in the log generation/retrieval process section 300b in such a manner that the image data of the second resolution is related to the image ID.

(5) Outputting the image data from the input tone correction section 13 to the segmentation process section 14 in a later stage without any modification.

Further, when receiving the similar image retrieval request from a user via the operation panel 6 of the multifunction printer 200 or via the terminal device 400 connected via the network, the main control section of the multifunction printer 200 carries out the following processes.

(1) Reading out image data of the second resolution indicative of a matching key image from the image data storage section 313, causing the document matching process section 314 to calculate a feature point, coordinates of the feature point, and features on the basis of the image data of the second resolution, and causing, on the basis of the calculated features, a voting process to be carried out with respect to matching reference images whose features are stored in the features storage section 315.

(2) Reading out from the features storage section 315 features and coordinates of a feature point that are calculated based on the matching key image of the first resolution, and causing, on the basis of the features read out from the features storage section 315, a voting process to be carried out with respect to matching reference images whose features are stored in the features storage section 315.

(3) Carrying out the similarity determination process with respect to individual matching reference images, on the basis of the result of the voting process in the process (1) and the result of the voting process in the process (2).

(4) Causing the result of the similarity determination process to be transmitted to the terminal device 400 or to be displayed by a display section included in the operation panel 6.

In the present embodiment, all reference image data whose features are stored in the features storage section 315 and which are other than a matching key image are regarded as matching reference images. However, the present invention is not limited to this. For example, the present invention may be arranged so that when features are stored in the features storage section 315, the features are classified into groups according to a predetermined rule (such as the time when a job is executed, a user who executes the job or a group/department/post etc. to which the user belongs, kinds of document images, and contents of the job), a user specifies a range of retrieval (selects matching reference images) when requesting the similar image retrieval process, and regards only images satisfying the specified conditions as matching reference images.

In the present embodiment, each section (block) included in the multifunction printer 200 and/or the server 300 may be realized by software by using a processor such as a CPU. In this case, the multifunction printer 200 and/or the server 300 may include: CPUs (central processing unit) for executing a program for realizing functions of each section; ROMs (read only memory) that store the program; RAMs (random access memory) that develop the program; storage devices (storage media) such as a memory in which the program and various data are stored; and the like. In this case, the object of the present invention can be realized in such a manner that the multifunction printer 200 and/or the server 300 is provided with a computer-readable storage medium for storing program codes (such as executable program, intermediate code program, and source program) of control programs of the multifunction printer 200 and/or the server 300 which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a floppy disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the multifunction printer 200 and/or the server 300 may be arranged so as to be connectable to a communication network so that the program code is supplied to the multifunction printer 200 and/or the server 300 through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

Further, each block of the multifunction printer 200 or the server 300 is not necessarily realized by software, but may be realized by hardware logic, and may be realized by a combination of hardware carrying out some of the processes and computing means controlling the hardware and executing program code for the other processes.

The image processing apparatus of the present invention is an image processing apparatus, including: a features extraction section for extracting, from image data, features of an image that are included in the image data; features storage means for storing features of a reference image and identification information of the reference image in such a manner that the features are related to the identification information; and a similar image retrieval section for comparing features of an image designated as a matching key image with features of at least one matching reference image which is an image to be matched out of reference images whose features are stored in the features storage means, so as to calculate a similarity between the matching key image and each of said at least one matching reference image, and retrieving a similar image similar to the matching key image on a basis of the calculated similarity; the image processing apparatus including a resolution conversion section for converting resolution of the matching key image into first resolution and second resolution different from the first resolution, the similar image retrieval section retrieving the similar image on a basis of (i) a result of a first comparison process in which the features extraction section compares features extracted by the features extraction section from the matching key image of the first resolution with features of each of said at least one matching reference image that are stored in the features storage means and (ii) a result of a second comparison process in which the features extraction section compares features extracted by the features extraction section from the matching key image of the second resolution with features of each of said at least one matching reference image that are stored in the features storage means.

With the arrangement, the similar image is retrieved on a basis of (i) a result of a first comparison process in which the features extraction section compares features extracted by the features extraction section from the matching key image of the first resolution with features of each of said at least one matching reference image that are stored in the features storage means and (ii) a result of a second comparison process in which the features extraction section compares features extracted by the features extraction section from the matching key image of the second resolution with features of each of said at least one matching reference image that are stored in the features storage means. Since the similar image retrieval process is carried out on a basis of image data with plural resolutions with respect to the matching key image, it is possible to accurately retrieve a matching reference image similar to the matching key image, even when the matching key image an enlarged/reduced image, an N-up image, or an image of low resolution.

The image processing apparatus of the present invention may be arranged so that the similar image retrieval section carries out a first retrieval process for retrieving a similar image on a basis of the result of the first comparison process, and when a similar image is not retrieved in the first retrieval process, the similar image retrieval section carries out a second retrieval process for retrieving a similar image on a basis of the result of the second comparison process.

With the arrangement, the first retrieval process for retrieving a similar image on a basis of the result of the first comparison process is firstly performed, and when a similar image is not retrieved in the first retrieval process, the second retrieval process for retrieving a similar image on a basis of the result of the second comparison process is carried out. Therefore, the second retrieval process is not carried out when a similar image can be specified only by the first retrieval process, which reduces a time necessary for the retrieval process.

The image processing apparatus may be arranged so that the similar image retrieval section carries out a first similarity calculation process for calculating a similarity between the matching key image and each of said at least one matching reference image on a basis of the result of the first comparison process, and a second similarity calculation process for calculating a similarity between the matching key image and each of said at least one matching reference image on a basis of the result of the second comparison process, and the similar image retrieval section retrieves a similar image on a basis of a similarity that is obtained by adding the similarity calculated in the first similarity calculation process and the similarity calculated in the second similarity calculation process with respect to each matching reference image.

With the arrangement, the similar image is retrieved based on a similarity obtained by adding the similarity calculated in the first similarity calculation process and the similarity calculated in the second similarity calculation process with respect to each matching reference image. This allows further accurately retrieving the similar image.

The image processing apparatus of the present invention may be arranged so that the similar image retrieval section carries out a first similarity calculation process for calculating a similarity between the matching key image and each of said at least one matching reference image on a basis of the result of the first comparison process, and a second similarity calculation process for calculating a similarity between the matching key image and each of said at least one matching reference image on a basis of the result of the second comparison process, and the similar image retrieval section retrieves a similar image on a basis of a maximum similarity selected from the group consisting of the similarity calculated in the first similarity calculation process and the similarity calculated in the second similarity calculation process.

With the arrangement, the similar image is retrieved on a basis of the maximum similarity selected from the group consisting of the similarity calculated in the first similarity calculation process and the similarity calculated in the second similarity calculation process, i.e. on a basis of the highest similarity. This allows further accurately retrieving the similar image.

The image processing apparatus of the present invention may be arranged so as to further include: image data storage means for storing image data of the reference image and the identification information of the reference image in such a manner that the image data is related to the identification information; a display section for displaying an image indicated by image data stored in the image data storage means; an operation input section for receiving a user's instruction to select a matching key image from images displayed by the display section; and a storage process section for, when causing the features storage means to store the features of the reference image, causing features of the reference image having been converted to the first resolution and identification information of the reference image to be stored in the features storage means in such a manner that the features of the reference image are related to the identification information of the reference image, and causing image data of the reference image having been converted to the second resolution and identification information of the reference image to be stored in the image data storage section in such a manner that the image data of the reference image is related to the identification information of the reference image, when carrying out the first comparison process, the similar image retrieval section comparing features extracted from an image of the first resolution corresponding to the matching key image which features are stored in the features storage means with features of the matching reference image which are stored in the features storage means, when carrying out the second comparison process, the features extraction section extracting features of the matching key image on a basis of image data of the second resolution corresponding to the matching key image which image data is stored in the image data storage means, and the similar image retrieval section comparing the features extracted by the features extraction section from the image data of the second resolution corresponding to the matching key image with the features of the matching reference image that are stored in the features storage means.

With the arrangement, the user designates a matching key image out of reference images that have been stored beforehand, and a matching reference image similar to the designated matching key image is retrieved. Further, when causing features of a reference image in the features storage means, features of the reference image with the first resolution are stored in the features storage means in such a manner that the features are related to the identification information of the reference image, and image data of the reference image with the second resolution is stored in the image data storage section in such a manner that the image data is related to the identification information of the reference image. This allows reducing storage capacity required for the image data storage means.

The image processing apparatus of the present invention may be arranged so that the second resolution is lower than the first resolution. With the arrangement, it is possible to further reduce storage capacity required for the image data storage means.

The image forming apparatus of the present invention includes one of the aforementioned image processing apparatuses and an image output section for forming an image corresponding to image data on a recording material.

With the arrangement, the similar image retrieval process is carried out based on image data with plural resolutions with respect to a matching key image. Therefore, it is possible to accurately retrieve a matching reference image similar to the matching key image even when the matching key image is an enlarged/reduced image, an N-up image, or an image of low resolution.

The image processing system of the present invention is an image processing system, including an image processing apparatus for carrying out a predetermined process on image data, and a server communicably connected with the image processing apparatus, there being provided a features extraction section for extracting, from image data, features of an image that are included in the image data; features storage means for storing features of a reference image and identification information of the reference image in such a manner that the features are related to the identification information; a similar image retrieval section for comparing features of an image designated as a matching key image with features of at least one matching reference image which is an image to be matched out of reference images whose features are stored in the features storage means, so as to calculate a similarity between the matching key image and each of said at least one matching reference image, and retrieving a similar image similar to the matching key image on a basis of the calculated similarity; and a resolution conversion section for converting resolution of the matching key image into first resolution and second resolution different from the first resolution, the features extraction section, the features storage means, the similar image retrieval section, and the resolution conversion section are included in the image processing apparatus or the server, or are divided into the image processing apparatus and the server, the similar image retrieval section retrieving the similar image on a basis of (i) a result of a first comparison process in which the features extraction section compares features extracted by the features extraction section from the matching key image of the first resolution with features of each of said at least one matching reference image that are stored in the features storage means and (ii) a result of a second comparison process in which the features extraction section compares features extracted by the features extraction section from the matching key image of the second resolution with features of each of said at least one matching reference image that are stored in the features storage means.

With the arrangement, the similar image retrieval process is carried out based on image data with plural resolutions with respect to a matching key image. Therefore, it is possible to accurately retrieve a matching reference image similar to the matching key image even when the matching key image is an enlarged/reduced image, an N-up image, or an image of low resolution.

The image processing method of the present invention is an image processing method for carrying out a similar image retrieval process for comparing features of a matching key image with features of at least one matching reference image that is preliminary stored, so as to calculate a similarity between the matching key image and said at least one matching reference image, and retrieving a similar image similar to the matching key image on a basis of the calculated similarity, the method including the steps of: (a) converting resolution of the matching key image into first resolution and second resolution different from the first resolution; (b) extracting features of the matching key image of the first resolution; (c) extracting features of the matching key image of the second resolution, and (d) retrieving the similar image on a basis of (i) a result of a first comparison process in which the features extracted in the step (b) are compared with the features of said at least one matching reference image and (ii) a result of a second comparison process in which the features extracted in the step (c) are compared with the features of said at least one matching reference image.

With the arrangement, the similar image retrieval process is carried out based on image data with plural resolutions with respect to a matching key image. Therefore, it is possible to accurately retrieve a matching reference image similar to the matching key image even when the matching key image is an enlarged/reduced image, an N-up image, or an image of low resolution.

The image processing apparatus may be realized by a computer. In this case, the present invention also encompasses: an image processing program for causing the computer to function as each section of the image processing apparatus; and a computer-readable storage medium in which the image processing program is stored.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An image processing apparatus comprising:
a features storage device;
an image data storage device;
a resolution conversion section for converting resolution of image data into a first resolution and a second resolution that is lower than the first resolution;
a storage process section for causing the features storage device and the image data storage device to store a reference image in such a manner that (a) the features storage device is caused to store (i) features, which have been extracted by the features extraction section out of image data of the reference image, which image data has been converted to the first resolution by the resolution conversion section, and (ii) identification information of the reference image in such a manner that the features are related to the identification information, and (b) the image data storage device is caused to store (i) image data of the reference image, which image data has been converted to the second resolution by the resolution conversion section, and (ii) the identification information of the reference image in such a manner that the image data is related to the identification information; and a similar image retrieval section for retrieving a similar image similar to a matching key image out of at least one matching reference image which is an image to be matched out of reference images whose features are stored in the features storage device, the resolution conversion section being configured to convert resolution of the matching key image into the first resolution and the second resolution, the features extraction section being configured to extract (i) features of the matching key image which has been converted to the first resolution, (ii) features of the matching key image which has been converted to the second resolution, and (iii) features of each of said at least one matching reference image of the second resolution stored in the image data storage device, the similar image retrieval section being configured to carry out:

(1) a first similarity calculation process for calculating a first similarity between the matching key image and each of said at least one matching reference image of the first resolution by comparing (i) features, which have been extracted by the features extraction section, of the matching key image of the first resolution with (ii) features of each of said at least one matching reference image of the first resolution stored in the features storage device, and (2) a second similarity calculation process for calculating a second similarity between the matching key image and each of said at least one matching reference image of the second resolution by comparing (i) features, which have been extracted by the features extraction section, of the matching key image of the second resolution with (ii) features, which have been extracted by the features extraction section, of each of said at least one matching reference image of the second resolution, and the similar image retrieval section being configured to further carry out:

(a) a retrieval process for retrieving, as the similar image, (i) a matching reference image having an added similarity highest among at least one added similarity each of which is defined by the first similarity and the second similarity added to each of said at least one matching reference image, (ii) at least one matching reference image having an added similarity which is equal to or higher than a predetermined similarity set in advance, (iii) a matching reference image having a maximum similarity selected from the group consisting of the similarity calculated in the first similarity calculation process and the similarity calculated in the second similarity calculation process, or (iv) a matching reference image having the maximum similarity which is equal to or higher than a predetermined similarity, or (b) one of the first similarity calculation process and the second similarity calculation process, and then (i) the similar image retrieval section carrying out a first similar image retrieval process for retrieving, as the similar image, a matching reference image having a similarity, which has been calculated in said one of the first similarity calculation process and the second similarity calculation process, is equal to or higher than a predetermined similarity, (ii) in a case where the matching reference image, which has the similarity equal to or higher than the predetermined similarity, is not retrieved in the first similar image retrieval process, the similar image retrieval section carrying out the other of the first similarity calculation process and the second similarity calculation process, and (iii) the similar image retrieval section carrying out a second similar image retrieval process for retrieving, as the similar image, a matching reference image having a similarity, which has been calculated in said other of the first similarity calculation process and the second similarity calculation process, is equal to or higher than a predetermined similarity, and the features extraction section, the resolution conversion section, the storage process section, and the similar image retrieval section being caused to function by a processor executing programs for carrying out the process(es) of each of the sections.

2. The image processing apparatus as set forth in claim 1, further comprising:

a display device for displaying a reference image whose image data of the second resolution is stored in the image data storage device; and an operation input device for receiving a user's instruction to select a matching key image from reference images displayed by the display device;

the similar image retrieval section calculating, in the first similarity calculation process, the first similarity by comparing (i) features of the matching key image of the first resolution stored in the features storage device with (ii) features of each of said at least one matching reference image of the first resolution stored in the features storage device, and the similar image retrieval section calculating, in the second similarity calculation process, the second similarity by comparing (iii) features which have been extracted by the features extraction section based on the matching key image of the second resolution stored in the image data storage device with (iv) features of each of said at least one matching reference image which have been extracted by the features extraction section based on each of said at least one matching reference image of the second resolution stored in the image data storage device.

3. An image forming apparatus comprising:
an image processing apparatus comprising:
a features storage device;
an image data storage device;
a resolution conversion section for converting resolution of image data into a first resolution and a second resolution that is lower than the first resolution;
a storage process section for causing the features storage device and the image data storage device to store a reference image in such a manner that (a) the features storage device is caused to store (i) features, which have been extracted by the features extraction section out of image data of the reference image, which image data has been converted to the first resolution by the resolution conversion section, and (ii) identification information of the reference image in such a manner that the features are related to the identification information, and (b) the image data storage device is caused to store (i) image data of the reference image, which image data has been converted to the second resolution by the resolution conversion section, and (ii) the identification information of the reference image in such a manner that the image data is related to the identification information; and a similar image retrieval section for retrieving a similar image similar to a matching key image out of at least one matching reference image which is an image to be matched out of reference images whose features are stored in the features storage device, the resolution conversion section being configured to convert resolution of the matching key image into the first resolution and the second resolution, the features extraction section being configured to extract (i) features of the matching key image which has been converted to the first resolution, (ii) features of the matching key image which has been converted to the second resolution, and (iii) features of each of said at least one matching reference image of the second resolution stored in the image data storage device, the similar image retrieval section being configured to carry out:
  (1) a first similarity calculation process for calculating a first similarity between the matching key image and each of said at least one matching reference image of the first resolution by comparing (i) features, which have been extracted by the features extraction section, of the matching key image of the first resolution with (ii) features of each of said at least one matching reference image of the first resolution stored in the features storage device, and
  (2) a second similarity calculation process for calculating a second similarity between the matching key image and each of said at least one matching reference image of the second resolution by comparing (i) features, which have been extracted by the features extraction section, of the matching key image of the second resolution with (ii) features, which have been extracted by the features extraction section, of each of said at least one matching reference image of the second resolution, and the similar image retrieval section being configured to further carry out:
  (c) a retrieval process for retrieving, as the similar image, (i) a matching reference image having an added similarity highest among at least one added similarity each of which is defined by the first similarity and the second similarity added to each of said at least one matching reference image, (ii) at least one matching reference image having an added similarity which is equal to or higher than a predetermined similarity set in advance, (iii) a matching reference image having a maximum similarity selected from the group consisting of the similarity calculated in the first similarity calculation process and the similarity calculated in the second similarity calculation process, or (iv) a matching reference image having the maximum similarity which is equal to or higher than a predetermined similarity, or
  (d) one of the first similarity calculation process and the second similarity calculation process, and then (i) the similar image retrieval section carrying out a first similar image retrieval process for retrieving, as the similar image, a matching reference image having a similarity, which has been calculated in said one of the first similarity calculation process and the second similarity calculation process, is equal to or higher than a predetermined similarity, (ii) in a case where the matching reference image, which has the similarity equal to or higher than the predetermined similarity, is not retrieved in the first similar image retrieval process, the similar image retrieval section carrying out the other of the first similarity calculation process and the second similarity calculation process, and (iii) the similar image retrieval section carrying out a second similar image retrieval process for retrieving, as the similar image, a matching reference image having a similarity, which has been calculated in said other of the first similarity calculation process and the second similarity calculation process, is equal to or higher than a predetermined similarity, and the features extraction section, the resolution conversion section, the storage process section, and the similar image retrieval section being caused to function by a processor executing programs for carrying out the process(es) of each of the sections; and an image output device for forming an image corresponding to image data on a recording material.

4. An image processing system, comprising an image processing apparatus for carrying out a predetermined process on image data, and a server communicably connected with the image processing apparatus, there being provided
a features extraction section for extracting, from image data, features of an image that are included in the image data;
a features storage device
an image data storage device;
a resolution conversion section for converting resolution of image data into a first resolution and a second resolution that is lower than the first resolution;
a storage process section for causing the features storage device and the image data storage device to store a reference image in such a manner that (a) the features storage device is caused to store (i) features, which have been extracted by the features extraction section out of image data of the reference image, which image data has been converted to the first resolution by the resolution conversion section, and (ii) identification information of the reference image in such a manner that the features are related to the identification information, and (b) the image data storage device is caused to store (i) image data of the reference image, which image data has been converted to the second resolution by the resolution conversion section, and (ii) the identification information of the reference image in such a manner that the image data is related to the identification information; and a similar image retrieval section retrieving a similar image similar to a matching key image out of at least one matching reference image which is an image to be matched out of reference images whose features are stored in the features storage device, the features extraction section, the features storage device, the image data storage device, the resolution conversion section, the storage process section, and the similar image retrieval section being included in the image processing apparatus or the server, or are divided into the image processing apparatus and the server, the resolution conversion section being configured to convert resolution of the matching key image into the first resolution and the second resolution, the features extraction section being configured to extract (i) features of the matching key image of the first resolution, (ii) features of the matching key image of the second resolution, and (iii) features of each of said at least one matching reference image of the second resolution stored in the image data storage device, the similar image retrieval section being configured to carry out:

(1) a first similarity calculation process for calculating a first similarity between the matching key image and each of said at least one matching reference image of the first resolution by comparing (i) features, which have been extracted by the features extraction section, of the matching key image of the first resolution with (ii) features of each of said at least one matching reference image of the first resolution stored in the features storage device, and (2) a second similarity calculation process for calculating a second similarity between the matching key image and each of said at least one matching reference image of the second resolution by comparing (i) features, which have been extracted by the features extraction section, of the matching key image of the second resolution with (ii) features, which have been extracted by the features extraction section, of each of said at least one matching reference image of the second resolution, and the similar image retrieval section being configured to further carry out:

(a) a retrieval process for retrieving, as the similar image, (i) a matching reference image having an added similarity highest among at least one added similarity each of which is defined by the first similarity and the second similarity added to each of said at least one matching reference image, (ii) at least one matching reference image having an added similarity which is equal to or higher than a predetermined similarity set in advance, (iii) a matching reference image having a maximum similarity selected from the group consisting of the similarity calculated in the first similarity calculation process and the similarity calculated in the second similarity calculation process, or (iv) a matching reference image having the maximum similarity which is equal to or higher than a predetermined similarity, or (b) one of the first similarity calculation process and the second similarity calculation process, and then (i) the similar image retrieval section carrying out a first similar image retrieval process for retrieving, as the similar image, a matching reference image having a similarity, which has been calculated in said one of the first similarity calculation process and the second similarity calculation process, is equal to or higher than a predetermined similarity, (ii) in a case where the matching reference image, which has the similarity equal to or higher than the predetermined similarity, is not retrieved in the first similar image retrieval process, the similar image retrieval section carrying out the other of the first similarity calculation process and the second similarity calculation process, and (iii) the similar image retrieval section carrying out a second similar image retrieval process for retrieving, as the similar image, a matching reference image having a similarity, which has been calculated in said other of the first similarity calculation process and the second similarity calculation process, is equal to or higher than a predetermined similarity, and the features extraction section, the resolution conversion section, the storage process section, and the similar image retrieval section being caused to function by a processor executing programs for carrying out the process(es) of each of the sections.

5. An image processing method comprising the steps of:

extracting, from image data, features of an image that are included in the image data;

converting resolution of image data into first resolution and second resolution which is lower than the first resolution;

causing a features storage device and an image data storage device to store a reference image in such a manner that (a) the features storage device is caused to store (i) features which have been extracted out of image data of the reference image in the step of extracting features, the image data having been converted to the first resolution in the step of converting resolution, and (ii) identification information of the reference image in such a manner that the features are related to the identification information, and (b) the image data storage device is caused to store (i) image data of the reference image, which image data has been converted to the second resolution in the step of converting resolution, and (ii) the identification information of the reference image in such a manner that the image data is related to the identification information; and retrieving a similar image similar to a matching key image out of at least one matching reference image which is an image to be matched out of reference images whose features are stored in the features storage device, wherein:

in the step of converting resolution, resolution of the matching key image being converted into the first resolution and the second resolution, in the step of extracting features, (i) features of the matching key image which has been converted to the first resolution, (ii) features of the matching key image which has been converted to the second resolution, and (iii) features of each of said at least one matching reference image of the second resolution stored in the image data storage device, are extracted, and wherein:

the step of retrieving a similar image including:

performing a first similarity calculation process for calculating a first similarity between the matching key image and each of said at least one matching reference image of the first resolution by comparing (i) features, which have been extracted in the step of extracting features, of the matching key image of the first resolution with (ii) features of each of said at least one matching reference image of the first resolution stored in the features storage device; and performing a second similarity calculation process for calculating a second similarity between the matching key image and each of said at least one matching reference image of the second resolution by comparing (i) features, which have been extracted in the step of extracting features, of the matching key image of the second resolution with (ii) features, which have been extracted in the step of extracting features, of each of said at least one matching reference image of the second resolution, and the step of retrieving a similar image including:

performing (a) a retrieval process for retrieving, as the similar image, (i) a matching reference image having an added similarity highest among at least one added similarity each of which is defined by the first similarity and the second similarity added to each of said at least one matching reference image, (ii) at least one matching reference image having an added similarity which is equal to or higher than a predetermined similarity set in advance, (iii) a matching reference image having a maximum similarity selected from the group consisting of the similarity calculated in the first similarity calculation process and the similarity calculated in the second similarity calculation process, or (iv) a matching reference image having the maximum similarity which is equal to or higher than a predetermined similarity; or performing (b) one of the first similarity calculation process and the second similarity calculation process, and then (i) performing a first similar image retrieval process for retrieving, as the similar image, a matching reference image having a similarity, which has been calculated in said one of the first similarity calculation process and the second similarity calculation process, is equal to or higher than a predetermined similarity, (ii) performing, in a case where the matching reference image, which has the similarity equal to or higher than the predetermined similarity, is not retrieved in the first similar image retrieval process, the other of the first similarity calculation process and the second similarity calculation process, and (iii) performing a second similar image retrieval process for retrieving, as the similar image, a matching reference image having a similarity, which has been calculated in said other of the first similarity calculation process and the second similarity calculation process, is equal to or higher than a predetermined similarity.

6. A non-transitory computer-readable storage medium, in which an image processing program is stored, the image processing program causing the operation an image processing apparatus the image processing apparatus comprising:

a features storage device;

an image data storage device;

a resolution conversion section for converting resolution of image data into a first resolution and a second resolution that is lower than the first resolution;

a storage process section for causing the features storage device and the image data storage device to store a reference image in such a manner that (a) the features storage device is caused to store (i) features, which have been extracted by the features extraction section out of image data of the reference image, which image data has been converted to the first resolution by the resolution conversion section, and (ii) identification information of the reference image in such a manner that the features are related to the identification information, and (b) the image data storage device is caused to store (i) image data of the reference image, which image data has been converted to the second resolution by the resolution conversion section, and (ii) the identification information of the reference image in such a manner that the image data is related to the identification information; and a similar image retrieval section for retrieving a similar image similar to a matching key image out of at least one matching reference image which is an image to be matched out of reference images whose features are stored in the features storage device, the resolution conversion section being configured to convert resolution of the matching key image into the first resolution and the second resolution, the features extraction section being configured to extract (i) features of the matching key image which has been converted to the first resolution, (ii) features of the matching key image which has been converted to the second resolution, and (iii) features of each of said at least one matching reference image of the second resolution stored in the image data storage device, the similar image retrieval section being configured to carry out:

(1) a first similarity calculation process for calculating a first similarity between the matching key image and each of said at least one matching reference image of the first resolution by comparing (i) features, which have been extracted by the features extraction section, of the matching key image of the first resolution with (ii) features of each of said at least one matching reference image of the first resolution stored in the features storage device, and (2) a second similarity calculation process for calculating a second similarity between the matching key image and each of said at least one matching reference image of the second resolution by comparing (i) features, which have been extracted by the features extraction section, of the matching key image of the second resolution with (ii) features, which have been extracted by the features extraction section, of each of said at least one matching reference image of the second resolution, and the similar image retrieval section being configured to further carry out:

(e) a retrieval process for retrieving, as the similar image, (i) a matching reference image having an added similarity highest among at least one added similarity each of which is defined by the first similarity and the second similarity added to each of said at least one matching reference image, (ii) at least one matching reference image having an added similarity which is equal to or higher than a predetermined similarity set in advance, (iii) a matching reference image having a maximum similarity selected from the group consisting of the similarity calculated in the first similarity calculation process and the similarity calculated in the second similarity calculation process, or (iv) a matching reference image having the maximum similarity which is equal to or higher than a predetermined similarity, or (f) one of the first similarity calculation process and the second similarity calculation process, and then (i) the similar image retrieval section carrying out a first similar image retrieval process for retrieving, as the similar image, a matching reference image having a similarity, which has been calculated in said one of the first similarity calculation process and the second similarity calculation process, is equal to or higher than a predetermined similarity, (ii) in a case where the matching reference image, which has the similarity equal to or higher than the predetermined similarity, is not retrieved in the first similar image retrieval process, the similar image retrieval section carrying out the other of the first similarity calculation process and the second similarity calculation process, and (iii) the similar image retrieval section carrying out a second similar image retrieval process for retrieving, as the similar image, a matching reference image having a similarity, which has been calculated in said other of the first similarity calculation process and the second similarity calculation process, is equal to or higher than a predetermined similarity, and the features extraction section, the resolution conversion section, the storage process section, and the similar image retrieval section being caused to function by a processor executing programs for carrying out the process(es) of each of the sections; and the image processing program causing a computer to function as each section of the image processing apparatus.

* * * * *